(12) United States Patent
Lim et al.

(10) Patent No.: US 9,927,669 B2
(45) Date of Patent: Mar. 27, 2018

(54) LIQUID CRYSTAL DISPLAY

(71) Applicant: Samsung Display Co., Ltd., Yongin, Gyeonggi-Do (KR)

(72) Inventors: Sang Uk Lim, Yongin-si (KR); Il Gon Kim, Seoul (KR); Sang Jin Jeon, Suwon-si (KR); Mee Hye Jung, Suwon-si (KR); Sung Hwan Kim, Yongin-si (KR); Eun Ju Kim, Suwon-si (KR)

(73) Assignee: SAMSUNG DISPLAY CO., LTD. (KR)

(*) Notice: Subject to any disclaimer, the term of this patent is extended or adjusted under 35 U.S.C. 154(b) by 0 days.

(21) Appl. No.: 14/638,977

(22) Filed: Mar. 4, 2015

(65) Prior Publication Data
US 2015/0253638 A1 Sep. 10, 2015

(30) Foreign Application Priority Data
Mar. 6, 2014 (KR) .................. 10-2014-0026723

(51) Int. Cl.
*G02F 1/1362* (2006.01)
*G02F 1/1343* (2006.01)
*G02F 1/1337* (2006.01)

(52) U.S. Cl.
CPC .. *G02F 1/136213* (2013.01); *G02F 1/134309* (2013.01); *G02F 1/133707* (2013.01); *G02F 2001/134345* (2013.01)

(58) Field of Classification Search
CPC ......... G02F 1/136213; G02F 1/134309; G02F 2001/134345; G02F 1/13624; G02F 1/1343; G02F 1/134336; G02F 2201/123; G02F 1/133707; G09G 2300/0876; G09G 2300/0443; G09G 2300/0809; G09G 2320/0209; G09G 2300/0814; G09G 2300/0842; G09G 2300/0823; H01L 27/1255
USPC .............. 349/38, 39, 48, 141, 144, 143
See application file for complete search history.

(56) References Cited

U.S. PATENT DOCUMENTS

| 7,061,562 B2 | 6/2006 | Kim et al. |
| 7,656,474 B2 | 2/2010 | Hanaoka et al. |
| 7,880,852 B2 | 2/2011 | Kim |
| 7,999,879 B2 * | 8/2011 | Yoshida ............ G02F 1/134363 349/129 |
| 8,035,787 B2 | 10/2011 | Jung et al. |

(Continued)

*Primary Examiner* — Angela Davison
(74) *Attorney, Agent, or Firm* — Innovation Counsel LLP

(57) ABSTRACT

A liquid crystal display includes: a first substrate; a reference voltage line including a storage electrode; a pixel electrode including a first subpixel electrode and a second subpixel electrode, and disposed in a pixel area; a second substrate facing the first substrate; and a liquid crystal layer provided between the first substrate and the second substrate, wherein the first subpixel electrode includes a first horizontal stem and a first vertical stem, the second subpixel electrode includes a second horizontal stem and a second vertical stem, the second subpixel electrode is provided to an external side of the pixel area to surround the first subpixel electrode, and the storage electrode includes a first storage electrode overlapping the first horizontal stem of the first subpixel electrode, and a second storage electrode overlapping the second vertical stem of the second subpixel electrodes.

17 Claims, 16 Drawing Sheets

(56) References Cited

U.S. PATENT DOCUMENTS

| | | |
|---|---|---|
| 8,125,600 B2 | 2/2012 | Nakanishi et al. |
| 8,264,651 B2 | 9/2012 | Cho et al. |
| 8,279,385 B2* | 10/2012 | Kim .................. G02F 1/134309 349/129 |
| 8,314,913 B2* | 11/2012 | Um .................... G02F 1/134363 349/129 |
| 8,358,393 B2* | 1/2013 | Hsieh ................ G02F 1/134309 349/129 |
| 8,482,701 B2 | 7/2013 | Tseng et al. |
| 8,487,852 B2 | 7/2013 | Cho et al. |
| 2012/0140153 A1* | 6/2012 | Kawashima ...... G02F 1/133707 349/96 |
| 2012/0236245 A1* | 9/2012 | Jung ................ G02F 1/134336 349/144 |
| 2012/0320294 A1* | 12/2012 | Kim ...................... C09K 19/02 349/41 |
| 2013/0002625 A1* | 1/2013 | Liao .................. G02F 1/134309 345/205 |

* cited by examiner

LIQUID CRYSTAL DISPLAY

CROSS-REFERENCE TO RELATED APPLICATION

This application claims priority to and the benefit of Korean Patent Application No. 10-2014-0026723 filed in the Korean Intellectual Property Office on Mar. 6, 2014, the entire contents of which are incorporated herein by reference.

BACKGROUND (a) Technical Field

The inventive concept relates to a liquid crystal display.

(b) Description of the Related Art

A liquid crystal display is one of the flat panel displays which are currently most widely used, and includes two sheets of display panels in which field generating electrodes such as a pixel electrode and a common electrode are formed, and a liquid crystal layer interposed therebetween.

The field generating electrodes are applied with a voltage to generate an electric field in the liquid crystal layer, and an orientation of liquid crystal molecules of the liquid crystal layer is determined and polarization of incident light is controlled based on the generated electric field to display an image.

The liquid crystal display further includes switching elements connected to each of the pixel electrodes, and a plurality of signal lines, such as gate lines and data lines, which control the switching elements to apply a voltage to the pixel electrodes.

Among the liquid crystal displays, a liquid crystal display of a vertically aligned mode in which major axes of the liquid crystal molecules are aligned perpendicular to the display panel in a state in which an electric field is not applied has a large contrast ratio and a wide reference viewing angle, and therefore has gotten a lot of attention. Herein, the reference viewing angle means a viewing angle in which a contrast ratio is 1:10 or an inter-gray luminance inversion critical angle.

In the case of the liquid crystal display of the vertically aligned mode, in order to make side visibility close to front visibility, a method of dividing one pixel into two subpixels and making transmittance different by applying a different voltage to the two subpixels has been proposed.

However, when the side visibility is close to the front visibility by dividing one pixel into two subpixels and making the transmittance different, transmittance is reduced due to a gap between two subpixels.

When the size of the liquid crystal display is increased, image quality is deteriorated by crosstalk. The deterioration of image quality may be prevented by increasing storage capacitance of a storage capacitor of the liquid crystal display. However, an area in which a pixel electrode overlaps a storage electrode must be increased to increase storage capacitance of the storage capacitor, so an aperture ratio of the liquid crystal display is reduced.

The above information disclosed in this Background section is only for enhancement of understanding of the background of the inventive concept and therefore it may contain information that does not form the prior art.

SUMMARY

The inventive concept has been made in an effort to provide a liquid crystal display for preventing deterioration of image quality caused by transmittance deterioration and crosstalk while approaching lateral visibility to front visibility.

An exemplary embodiment of the inventive concept provides a liquid crystal display including: a first substrate; a reference voltage line formed on the first substrate and including a storage electrode; a pixel electrode including a first subpixel electrode and a second subpixel electrode formed on the first substrate, separated from each other, and provided in a pixel area; a second substrate facing the first substrate; and a liquid crystal layer provided between the first substrate and the second substrate, wherein the first subpixel electrode includes a first horizontal stem, a first vertical stem, and a plurality of first branch electrodes extending from the first horizontal stem and the first vertical stem, the second subpixel electrode includes a second horizontal stem, a second vertical stem, and a plurality of second branch electrodes extending from the second horizontal stem and the second vertical stem, the second subpixel electrode is provided to an external side of the pixel area to surround the first subpixel electrode, and the storage electrode includes a first storage electrode overlapping the first horizontal stem of the first subpixel electrode, and a second storage electrode overlapping the second vertical stem of the second subpixel electrodes.

A first voltage applied to the first subpixel electrode is greater than a second voltage applied to the second subpixel electrode.

The second vertical stem is connected to the second horizontal stem and includes two vertical stems extending parallel to two opposing edges of the pixel electrode, the opposing edges being parallel to a data line.

The second storage electrode overlaps at least a part of the two vertical stems.

The first horizontal stem is connected to the first vertical stem to form a cross shape.

The storage electrode further includes a third storage electrode overlapping at least a part of the first vertical stem of the first subpixel electrode.

The first vertical stem extends between the second branch electrodes.

An overall shape of the first subpixel electrode is a polygon such as a hexagon, and an overall shape of the second subpixel electrode is a rectangle formed with four trapezoids.

The second vertical stem include a connecting portion connecting an upper portion and a lower portion of the second subpixel electrode and the second storage electrode overlaps substantially entire portion of the connecting portion.

The second storage electrode further includes a portion overlaps the first vertical stem.

The portion overlaps the first vertical stem overlaps a lower half of the first vertical stem.

The portion overlaps the first vertical stem overlaps substantially entire portion of the first vertical stem.

According to the liquid crystal display according to the exemplary embodiment of the inventive concept, deterioration of image quality caused by transmittance deterioration and crosstalk may be prevented while allowing lateral visibility to approach front visibility.

DETAILED DESCRIPTION OF THE EMBODIMENTS

Figure 1:
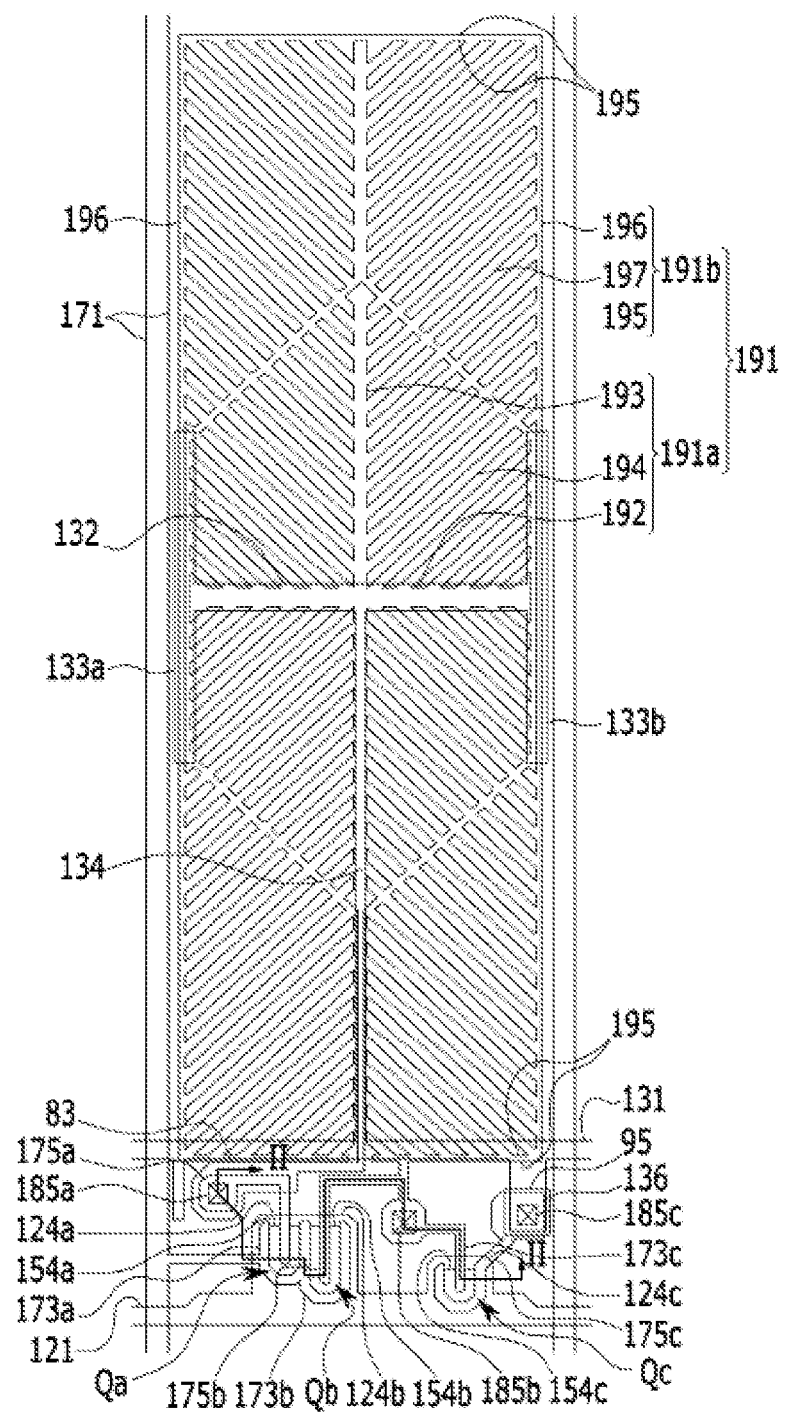
FIG. 1 shows a layout view of a liquid crystal display according to an exemplary embodiment of the inventive concept.

Hereinafter, exemplary embodiments of the inventive concept will be described in detail with reference to the accompanying drawings. As those skilled in the art would realize, the described embodiments may be modified in various different ways, all without departing from the spirit or scope of the inventive concept. On the contrary, exemplary embodiments introduced herein are provided to make disclosed contents thorough and complete and sufficiently transfer the spirit of the inventive concept to those skilled in the art.

In the drawings, the thickness of layers, films, panels, regions, etc., are exaggerated for clarity. It will be understood that when a layer is referred to as being "on" another layer or substrate, it can be formed directly on the other layer or substrate, or intervening layers, films, panels, regions, etc. may also be present. Like reference numerals designate like elements throughout the specification.

A liquid crystal display according to an exemplary embodiment of the inventive concept will now be described with reference to FIG. 1 and FIG. 2.

Figure 2:
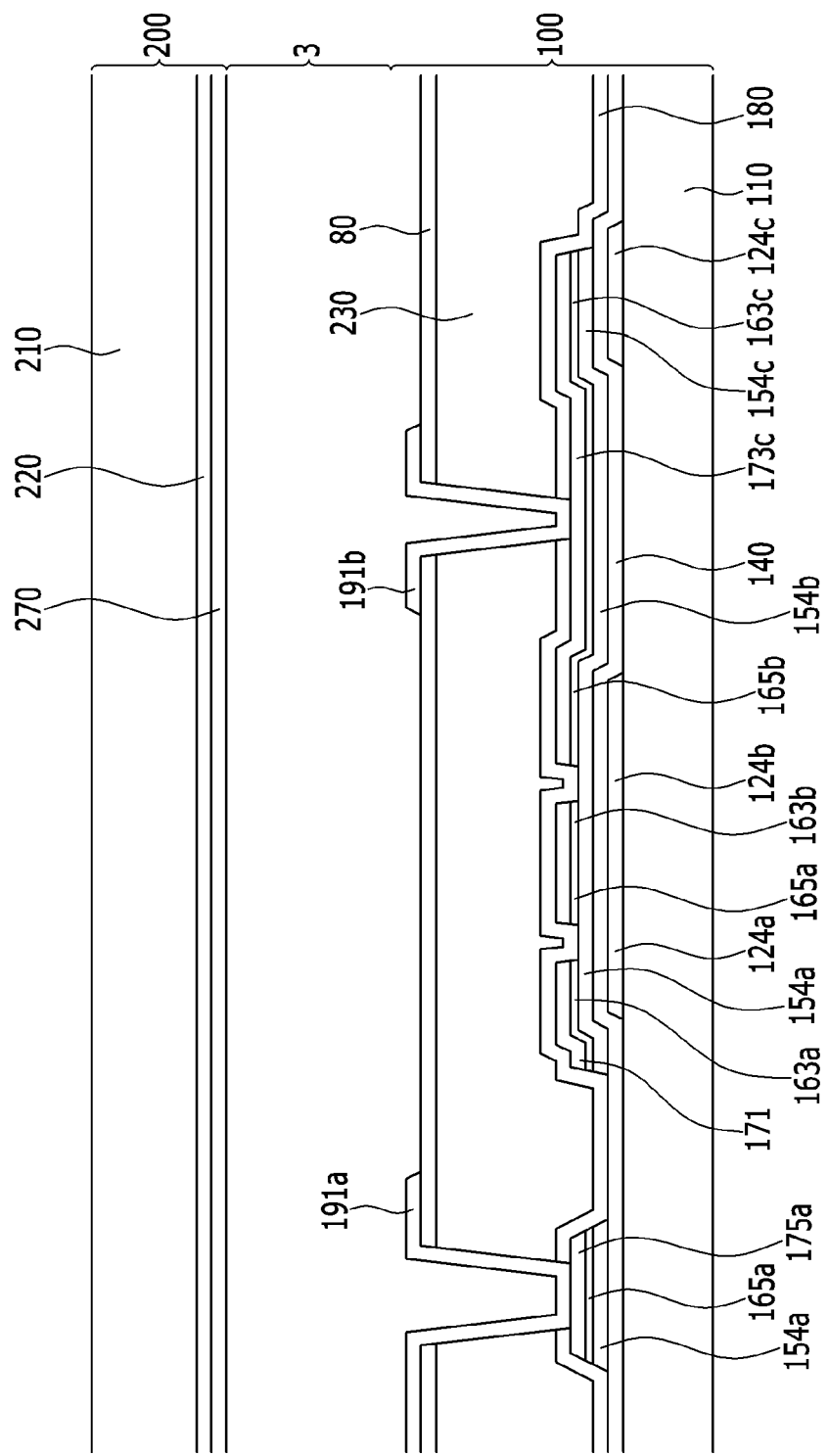
FIG. 2 shows a cross-sectional view of a liquid crystal display taken along a line II-II of FIG. 1.

FIG. 1 shows a layout view of a liquid crystal display according to an exemplary embodiment of the inventive concept, and FIG. 2 shows a cross-sectional view of a liquid crystal display taken along a line II-II of FIG. 1.

Referring to FIG. 1 and FIG. 2, the liquid crystal display includes a lower panel 100 and an upper panel 200 facing each other, and a liquid crystal layer 3 provided between the display panels 100 and 200.

The lower panel 100 will now be described.

A gate line 121, a reference voltage line 131, a first storage electrode 132, second storage electrodes 133a and 133b, and a third storage electrode 134 are formed on a first substrate 110 made of transparent glass or plastic. The gate line 121 is generally extends in a horizontal direction and transmits a gate signal.

The gate line 121 includes a first gate electrode 124a, a second gate electrode 124b, a third gate electrode 124c, and a wide end portion (not shown) for connection to another layer or an external driving circuit.

The reference voltage line 131 may extend in parallel with the gate line 121, it includes an expansion 136 which is connected to a third drain electrode 175c to be described.

The reference voltage line 131 includes storage electrodes including the first storage electrode 132, the second storage electrodes 133a and 133b, and the third storage electrode 134.

A gate insulating layer 140 is formed on the gate line 121, the reference voltage line 131, and the storage electrodes 132, 133a, 133b, and 134.

A first semiconductor 154a, a second semiconductor 154b, and a third semiconductor 154c made of amorphous silicon or crystalline silicon are formed on the gate insulating layer 140.

A plurality of ohmic contacts 163a, 163b, 163c, 165a, and 165b are formed on the first semiconductor 154a, the second semiconductor 154b, and the third semiconductor 154c. When the semiconductors 154a, 154b, and 154c are oxide semiconductors, the ohmic contacts may be omitted.

Data conductors including a data line 171, a first source electrode 173a and second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140.

The second drain electrode 175b is connected to the third source electrode 173c.

The first gate electrode 124a, the first source electrode 173a, and the first drain electrode 175a form a first thin film transistor Qa together with the first semiconductor 154a, and a channel of the thin film transistor is formed on the semiconductor 154a provided between the first source electrode 173a and the first drain electrode 175a. Similarly, the second gate electrode 124b, the second source electrode 173b, and the second drain electrode 175b form a second thin film transistor Qb together with the second semiconductor 154b, and the channel of the thin film transistor is formed on the semiconductor 154b provided between the second source electrode 173b and the second drain electrode 175b, and the third gate electrode 124c, the third source electrode 173c, and the third drain electrode 175c form a third thin film transistor (Qc) together with the third semiconductor 154c, and the channel of the thin film transistor is formed on the semiconductor 154c provided between the third source electrode 173c and the third drain electrode 175c.

A passivation layer 180 made of an inorganic insulator such as silicon nitride or silicon oxide is formed on the data conductors (171, 173a, 173b 173c, 175a, 175b, and 175c) and the exposed semiconductors 154a, 154b, and 154c.

A color filter 230 is provided on the passivation layer 180.

A light blocking member (not shown) may be provided in a region in which the color filter 230 is not provided and on a part of the color filter 230. The light blocking member is also called a black matrix, and prevents light leakage.

A capping layer 80 is provided on the color filter 230. The capping layer 80 prevents the color filter 230 from lifting, and also controls contamination of the liquid crystal layer 3 caused by an organic material such as a solvent provided by the color filter 230.

A pixel electrode 191 including a first subpixel electrode 191a and a second subpixel electrode 191b that are separated from each other is formed on the capping layer 80.

Referring to FIG. 1, an overall shape of the first subpixel electrode 191a is a polygon such as a hexagon, and the first subpixel electrode 191a is surrounded by the second subpixel electrode 191b. An overall shape of the second subpixel electrode 191b is a rectangle formed with four trapezoids, and it is provided on an edge of the pixel area.

The first subpixel electrode 191a includes cross stems 192 and 193 including a first horizontal stem 192 and a first vertical stem 193, and a plurality of first branch electrodes 194 extending from the cross stems 192 and 193. The first branch electrodes 194 extend in four different directions. In further detail, the first branch electrodes 194 include a plurality of first minute branches obliquely extending in the top left direction from the cross stems (192 and 193), a plurality of second minute branches obliquely extending in the top right direction, a plurality of third minute branches obliquely extending in the bottom left direction, and a plurality of fourth minute branches obliquely extending in the bottom right direction.

The second subpixel electrode 191b is formed to surround an edge of the pixel area, and includes a second horizontal stem 195, two second vertical stems 196, and a plurality of second branch electrodes 197 extending from the second horizontal stem 195, the second vertical stem 196. The two second vertical stems 196 are formed on two opposing edges of the pixel electrode 191 and extend in parallel with the data line. The second branch electrodes 197 extend in four different directions. In detail, the second branch electrodes 197 include a plurality of fifth minute branches obliquely extending in the top left direction from the cross stems 192 and 193, a plurality of sixth minute branches obliquely extending in the top right direction, a plurality of seventh minute branches extending in the bottom left direction, and a plurality of eighth minute branches extending in the bottom right direction.

The above-described first storage electrode 132 overlaps the first horizontal stem 192 of the first subpixel electrode 191a, and the two second storage electrodes 133a and 133b are connected to the first storage electrode 132 and overlap two second vertical stems 196 of the second subpixel electrode 191b.

The third storage electrode 134 is connected to the reference voltage line 131 and the first storage electrode 132, and overlaps at least a part of the first vertical stem 193 of the first subpixel electrode 191a.

A gap between an end of the first subpixel electrode 191a and an end of the second subpixel electrode 191b neighboring each other, that is, a separated gap between the first subpixel electrode 191a and the second subpixel electrode 191b, may be substantially 1 μm to 5 μm.

A first contact hole 185a for exposing a part of the first drain electrode 175a and a second contact hole 185b for exposing a part of the second drain electrode 175b are formed in the passivation layer 180 and the capping layer 80. A third contact hole 185c for exposing a part of the expansion 136 of the reference voltage line 131 and a part of the third drain electrode 175c is formed in the passivation layer 180, the capping layer 80, and the gate insulating layer 140. A connecting member 95 is formed over the third contact hole 185c. The expansion 136 of the reference voltage line 131 is connected to the third drain electrode 175c through the connecting member 95. The connecting member 95 is formed of the same layer and on the same plane as the pixel electrode 191.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive a data voltage from the first drain electrode 175a and the second drain electrode 175b through the first contact hole 185a and the second contact hole 185b.

The upper panel 200 will now be described.

A light blocking member 220 and a common electrode 270 are formed on a second substrate 210 made of transparent glass or plastic.

However, regarding a liquid crystal display according to another exemplary embodiment of the inventive concept, the light blocking member 220 may be provided on the lower panel 100, and the color filter may be provided on the upper panel 200.

An alignment layer (not shown) is formed inside the display panels 100 and 200, and may be vertical alignment layers.

A polarizer (not shown) is provided outside the display panels 100 and 200, transmissive axes of the two polarizers are orthogonal, and it is desirable for one of the transmissive axes to be parallel with the gate line 121. However, the polarizers may be disposed on one external side of the two display panels 100 and 200.

The liquid crystal layer 3 has negative dielectric anisotropy, and a longitudinal axis of liquid crystal molecules of the liquid crystal layer 3 is aligned perpendicular to surfaces of the display panels 100 and 200 when there is no electric field. Therefore, while there is no electric field, incident light does not pass through crossed polarizers but is blocked by the crossed polarizers.

At least one of the liquid crystal layer 3 and the alignment layer may include a photo-reactive material, in detail, a reactive mesogen.

Figure 3A:
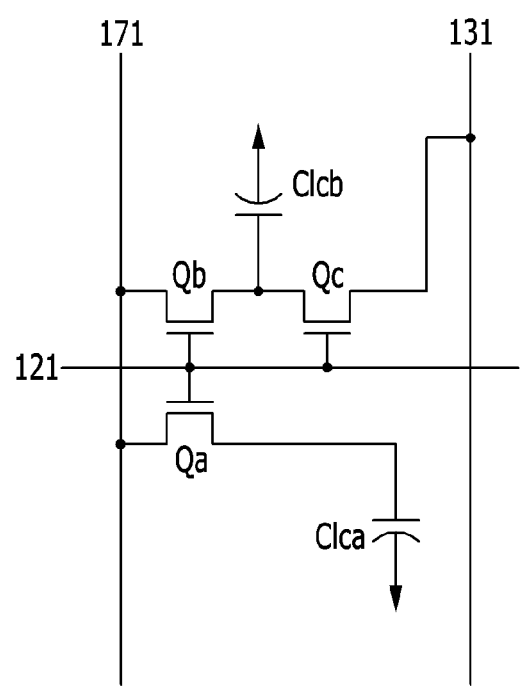
FIG. 3A shows an equivalent circuit diagram of a pixel of a liquid crystal display according to an exemplary embodiment of the inventive concept.

A method for driving a liquid crystal display according to the present exemplary embodiment will now be described with reference to FIG. 3A together with FIG. 1. FIG. 3A shows an equivalent circuit diagram of a pixel of a liquid crystal display according to an exemplary embodiment of the inventive concept.

When a gate-on signal is applied to the gate line 121, the gate-on signal is applied to the first gate electrode 124a, the second gate electrode 124b, and the third gate electrode 124c, and the first switching element Qa, the second switching element Qb, and the third switching element Qc are turned on. The data voltage applied to the data line 171 is applied to the first subpixel electrode 191a and the second subpixel electrode 191b through the turned on first switching element Qa and second switching element Qb. In this instance, a same voltage is applied to the first subpixel electrode 191a and the second subpixel electrode 191b. However, the voltage applied to the second subpixel electrode 191*b* is divided through the third switching element (Qc) connected in series to the second switching element Qb. The voltage applied to the second subpixel electrode 191*b* becomes lower than the voltage applied to the first subpixel electrode 191*a*.

Hence, charged voltages of a first liquid crystal capacitor formed between the first subpixel electrode 191*a* and the common electrode 270 and a second liquid crystal capacitor formed between the second subpixel electrode 191*b* and the common electrode 270 have gamma curves that are different from each other, and the gamma curve of one pixel becomes a combination curve of the two gamma curves. The combined gamma curve at the front corresponds to a reference gamma curve at the front and the combined gamma curve at the lateral side corresponds to the reference gamma curve at the front. Thus, lateral visibility is improved.

As described above, the separated gap between the first subpixel electrode 191*a* and the second subpixel electrode 191*b* may be substantially 1 μm to 5 μm.

According to the generally known liquid crystal display, the first subpixel electrode 191*a* and the second subpixel electrode 191*b* have a substantially rectangular shape, and are disposed above and below the pixel area. Further, the first subpixel electrode 191*a* and the second subpixel electrode 191*b* are formed to have a cross stem and a plurality of branch electrodes extending from the cross stem. In this case, transmittance of the liquid crystal display is deteriorated in a region between the first subpixel electrode 191*a* and the second subpixel electrode 191*b*, and each cross stem region of the first subpixel electrode 191*a* and the second subpixel electrode 191*b*.

However, in the case of the liquid crystal display according to an exemplary embodiment of the inventive concept, an entire shape of the first subpixel electrode 191*a* is a polygon such as a hexagon, the first subpixel electrode 191*a* is surrounded by the second subpixel electrode 191*b*. The second subpixel electrode consists of four parts. Each of the four parts has a trapezoidal shape and is provided on an edge of the pixel area.

Also, the first subpixel electrode 191*a* includes cross stems 192 and 193 including a first horizontal stem 192 and a first vertical stem 193 and a plurality of first branch electrodes 194 extending from the cross stems 192 and 193, and the second subpixel electrode 191*b* includes a second horizontal stem 195 and two second vertical stems 196 formed along an edge of the pixel area, and a plurality of second branch electrodes 197 extending from the second horizontal stem 195 and the second vertical stem 196. Therefore, the separated gap between the first subpixel electrode 191*a* and the second subpixel electrode 191*b* may be reduced, the stem of the second subpixel electrode 191*b* is not formed in a center of the pixel area, and the second subpixel electrode 191*b* includes a second horizontal stem 195 and a second vertical stem 196 formed along edges of the pixel area, thereby preventing deterioration of transmittance that may occur near the cross stem.

Further, a part of the vertical stem 193 of the first subpixel electrode 191*a* is provided between the second branch electrodes 197 of the second subpixel electrode 191*b*. In this instance, an electric field is generated between a part of the vertical stem 193 of the neighboring first subpixel electrode 191*a* and the second branch electrodes 197 of the second subpixel electrode 191*b* because of a voltage difference between the vertical stem 193 of the first subpixel electrode 191*a* and the second branch electrodes 197 of the second subpixel electrode 191*b*. Accordingly, the liquid crystal molecules that are provided near the vertical stem 193 of the first subpixel electrode 191*a* are slanted in a direction that is substantially parallel to the direction in which the second branch electrodes 197 of the second subpixel electrode 191*b* extends, thereby preventing deterioration of transmittance that may occur near the vertical stem 193 of the first subpixel electrode 191*a*.

In addition, the first storage electrode 132 overlaps the first horizontal stem 192 of the first subpixel electrode 191*a*, and the two second storage electrodes 133*a* and 133*b* are connected to the first storage electrode 132 and overlaps the two second vertical stems 196 of the second subpixel electrode 191*b*.

The third storage electrode 134 is connected to the reference voltage line 131 and the first storage electrode 132, and overlaps at least a part of the first vertical stem 193 of the first subpixel electrode 191*a*.

As described, a holding capacitor formed between the storage electrode, for example, the first storage electrode 132 and the third storage electrode 134, and the pixel electrode, for example the first horizontal stem 192 and the first vertical stem 193 of the first subpixel electrode 191*a*, may be maintained high enough to prevent crosstalk in a low gray. Further, crosstalk may be prevented in a high gray by using the first storage capacitor formed by the first subpixel electrode 191*a*, the first storage electrode 132, and the third storage electrode 134 overlapping each other, and a second storage capacitor formed by the second vertical stem 196 of the second subpixel electrode 191*b* and two second storage electrodes 133*a* and 133*b*.

A first storage electrode 132 and a third storage electrode 134 overlap the first horizontal stem 192 and the first vertical stem 193 of the first subpixel electrode 191*a* respectively. Two second storage electrodes 133*a* and 133*b* overlap the two second vertical stems 196 of the second subpixel electrode 191*b*. Storage electrodes (132, 133*a*, 133*b*, and 134) are formed on edges of a plurality of first branch electrodes 194 and a plurality of second branch electrodes 197. As described above, the storage electrodes are formed on pixel regions where the transmittance is relatively low, hence, deterioration of transmittance of the liquid crystal display may be minimized and deterioration of display quality caused by crosstalk may be prevented.

Further, the second subpixel electrode 191*b* to which a relatively low voltage is applied is formed to surround the first subpixel electrode 191*a* to which a relatively high voltage is applied, and the second subpixel electrode 191*b* is provided on an external side of the pixel area so unnecessary parasitic capacitance may be reduced because the difference in voltage between the second subpixel electrode 191*b* and the data line 171 is less than that of the first subpixel electrode 191*a* and the data line 171. In detail, since parasitic capacitance is proportional to a voltage difference of the overlapping electrodes, the parasitic capacitance that occurs when the first subpixel electrode 191*a* to which the relatively high voltage is applied overlaps the data line 171 becomes higher than parasitic capacitance that occurs when the second subpixel electrode 191*b* to which the relatively low voltage is applied overlaps the data line 171. Therefore, since the data line 171 overlaps the second subpixel electrode 191*b* which has a lower voltage than the first subpixel electrode 191*a*, unnecessary parasitic capacitance may be reduced compared to the case in which the first subpixel electrode 191*a* having relatively high voltage than the second subpixel electrode 191*b* overlaps the data line 171 with the same area.

As described above with reference to FIG. 3A, in order for the voltage charged in the first liquid crystal capacitor (Clca) connected to the first subpixel electrode 191*a* to become different from the voltage charged in the second liquid crystal capacitor (Clcb) connected to the second subpixel electrode 191b, the second subpixel electrode 191b is connected to the reference voltage line 131 through a third switching element (Qc) to share charge in the second subpixel electrode 191b with the reference voltage line 131. However, a liquid crystal display according to another exemplary embodiment of the inventive concept may include a second subpixel electrode 191b connected to a step-down capacitor, which will be described with reference to FIG. 3B.

Figure 3B:
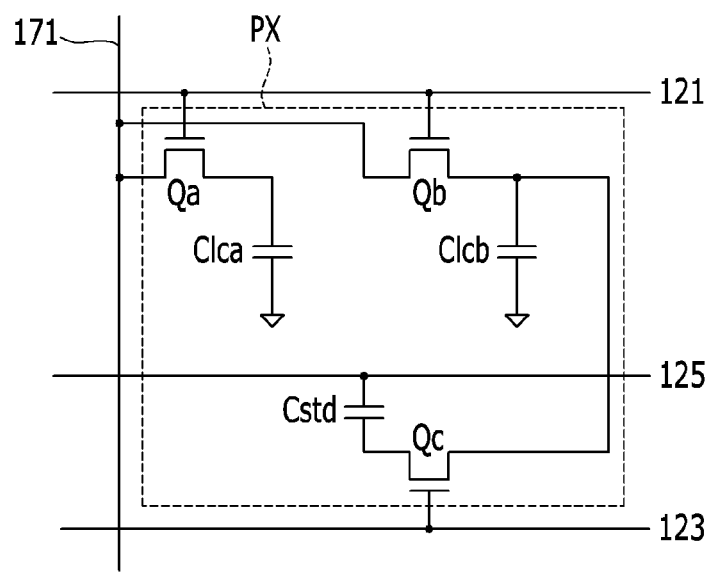
FIG. 3B shows an equivalent circuit diagram of a pixel of a liquid crystal display according to another exemplary embodiment of the inventive concept.

Referring to FIG. 3B, the liquid crystal display according to another exemplary embodiment of the inventive concept may include a third switching element (Qc) connected to an output terminal of the second switching element Qb connected to the second subpixel electrode 191b configuring the second liquid crystal capacitor (Clcb) and the step-down capacitor (Cstd). In this instance, the third switching element (Qc) may be connected to a step-down gate line 123 that is different from the first switching element Qa and the second switching element Qb, and when a gate on signal is applied to the gate line 121 to turn on the first switching element Qa and the second switching element Qb and then turn them off, a gate-on signal is applied to the step-down gate line 123 to turn on the third switching element (Qc). When the first switching element Qa and the second switching element Qb are turned on and are then turned off and the third switching element (Qc) is turned on, the charges move to the step-down capacitor (Cstd) from the second subpixel electrode 191b through the third switching element (Qc). A charged voltage of the second liquid crystal capacitor (Clcb) is reduced and the step-down capacitor is charged. Since the charged voltage of the second liquid crystal capacitor (Clcb) is reduced by capacitance of the step-down capacitor (Cstd), the charged voltage of the second liquid crystal capacitor (Clcb) becomes less than the charged voltage of the first liquid crystal capacitor (Clca). In this instance, a difference between the charged voltages may be controlled by a voltage applied to a second reference voltage line 125 connected to another terminal of the step-down capacitor (Cstd).

Figure 3C:
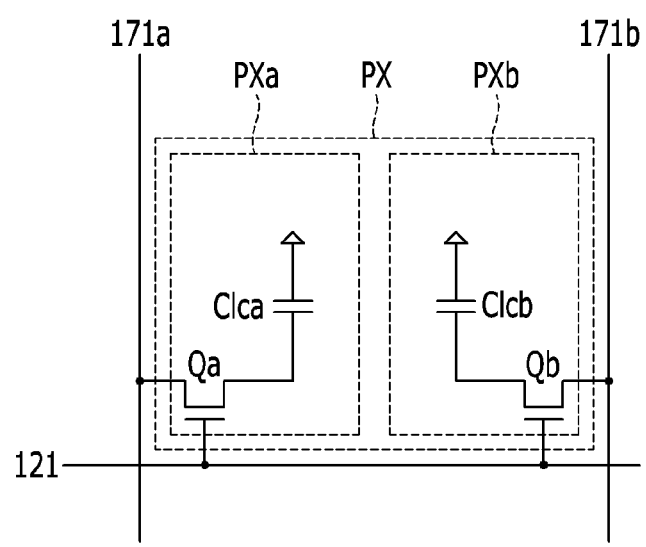
FIG. 3C shows an equivalent circuit diagram of a pixel of a liquid crystal display according to another exemplary embodiment of the inventive concept.

Also, as shown in FIG. 3C, regarding the liquid crystal display according to another exemplary embodiment of the inventive concept, the first liquid crystal capacitor (Clca) and the second liquid crystal capacitor (Clcb) are connected to the first data line 171a and the second data line 171b that are different from each other and receive different data voltages so the charged voltage between the first liquid crystal capacitor and the second liquid crystal capacitor may be controlled independently.

The charged voltage between the first liquid crystal capacitor (Clca) and the second liquid crystal capacitor (Clcb) may be differently set by various other methods.

Figure 4:
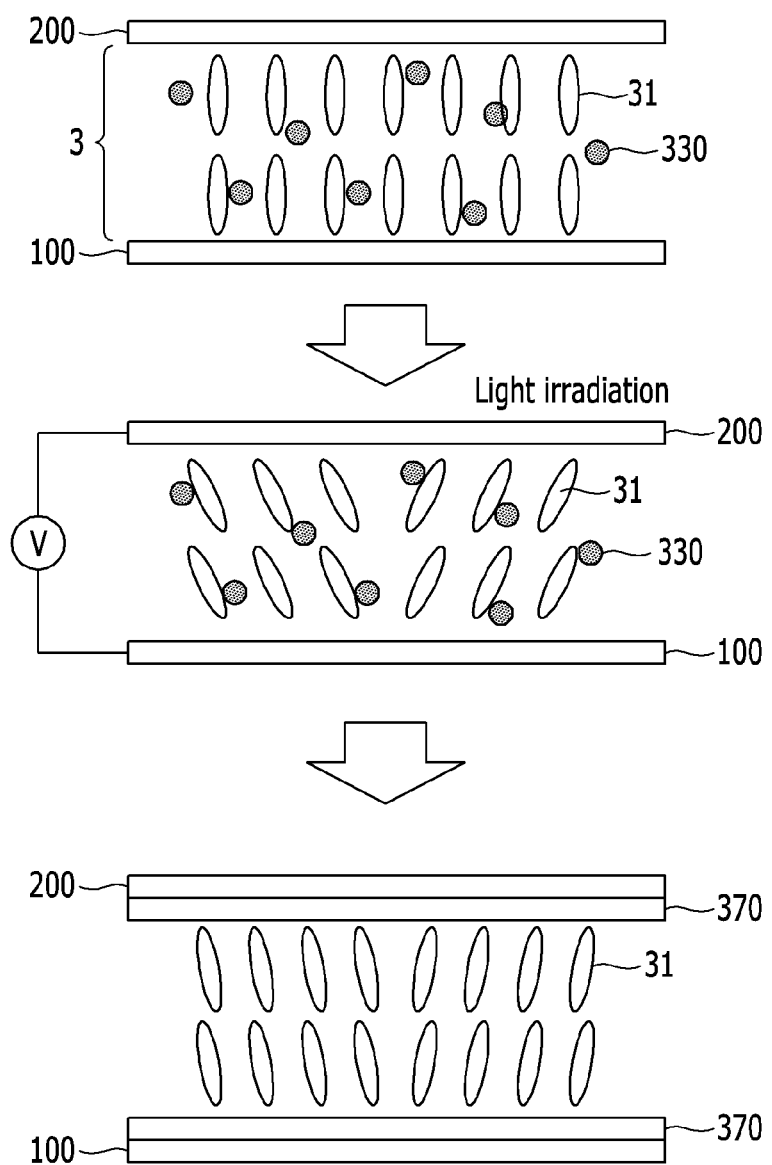
FIG. 4 shows a process for making liquid crystal molecules to have a pretilt by using a prepolymer polymerized by beams such as ultraviolet rays.

As described above, at least one of the liquid crystal layer 3 and an alignment layer may include a photo-reactive material, in further detail, a reactive mesogen. A method for initially aligning liquid crystal molecules 31 to have a pretilt by using a photo-reactive material will now be described with reference to FIG. 4. FIG. 4 shows a process for making liquid crystal molecules to have a pretilt by using prepolymers polymerized by light such as ultraviolet rays.

A prepolymer 330 such as a monomer or an oligomer which may be hardened by polymerization by light such as ultraviolet rays is injected between the display panels 100 and 200 together with a liquid crystal material. The prepolymer 330 may be a reactive mesogen polymerizable by light such as ultraviolet rays.

Different voltages are applied to the first subpixel electrode 191a and the second subpixel electrodes 191b through various methods, and a common voltage is applied to a common electrode 270 in the upper panel 200 to generate an electric field to the liquid crystal layer 3 between the display panels 100 and 200. The liquid crystal molecules 31 of the liquid crystal layer 3 respond to the electric field and are slanted in four different directions that are parallel to directions in which first branch electrodes 194 of the first subpixel electrode 191a extend by a fringe field formed by a plurality of first branch electrodes 194 of the first subpixel electrode 191a and the common electrode 270. The liquid crystal molecules 31 are slanted in four directions that are parallel to directions in which second branch electrodes 197 of the second subpixel electrode 191b extend by a fringe field formed by a plurality of second branch electrodes 197 of the second subpixel electrode 191b and the common electrode 270. In this instance, since different voltages are applied to the first subpixel electrode 191a and the second subpixel electrode 191b, a slanted angle of the liquid crystal molecules 31 corresponding to the first subpixel electrode 191a becomes different from a slanted angle of the liquid crystal molecules 31 corresponding to the second subpixel electrode 191b with respect to the first substrate 110.

When the electric field is generated to the liquid crystal layer 3 and light such as ultraviolet rays are irradiated, the prepolymer 330 is polymerized to form a polymer 370. The polymer 370 is formed to contact the display panels 100 and 200. An alignment direction is determined by the polymer 370 so that the liquid crystal molecules 31 may have a pretilt in the above-described directions. Therefore, the liquid crystal molecules 31 are arranged to have a pretilt in four different directions while no voltage is applied to the field generating electrodes 191 and 270.

Figure 5:
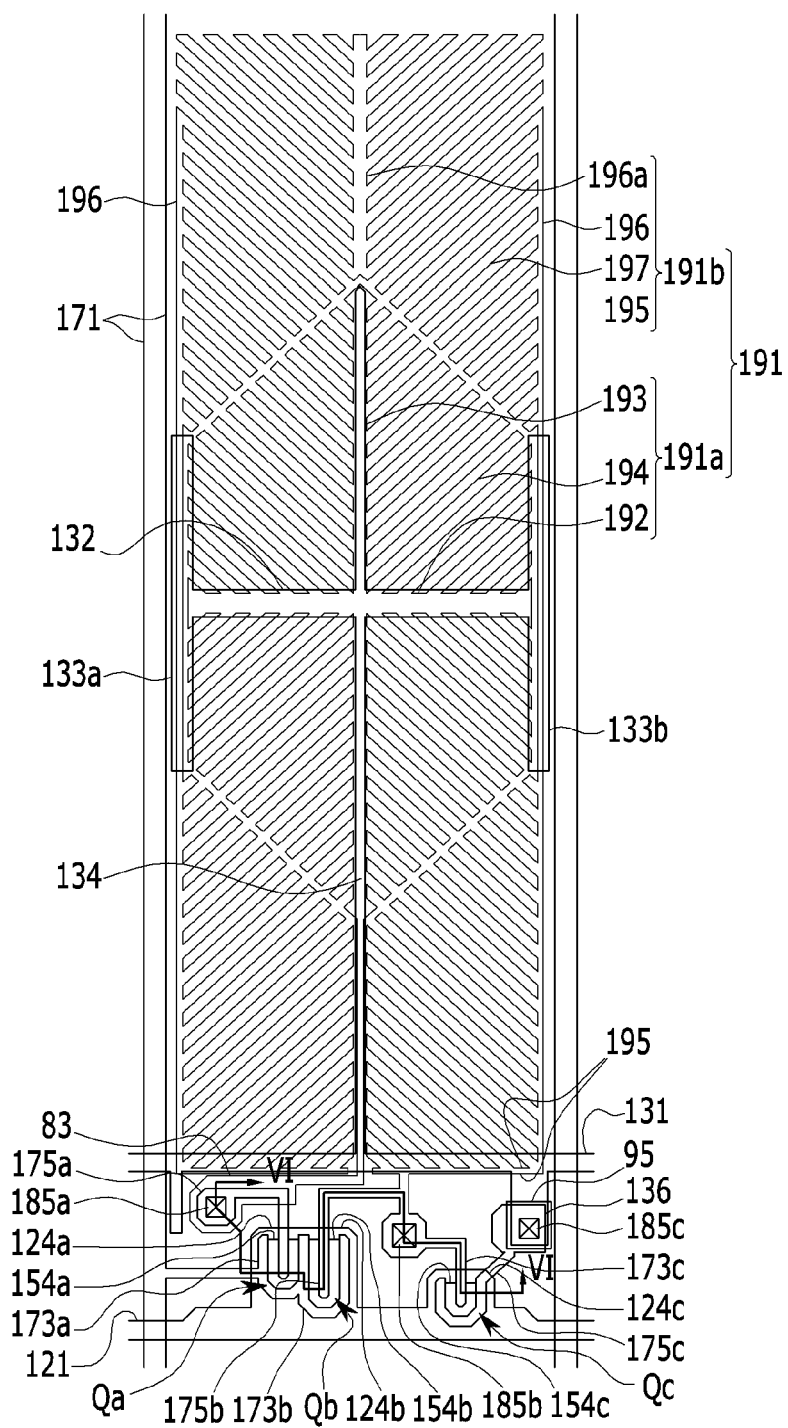
FIG. 5 shows a layout view of a liquid crystal display according to another exemplary embodiment of the inventive concept.

A liquid crystal display according to another exemplary embodiment of the inventive concept will now be described with reference to FIG. 5 and FIG. 6. FIG. 5 shows a layout view of a liquid crystal display according to another exemplary embodiment of the inventive concept, and FIG. 6 shows a cross-sectional view of a liquid crystal display of FIG. 5 taken along a line VI-VI.

Figure 6:
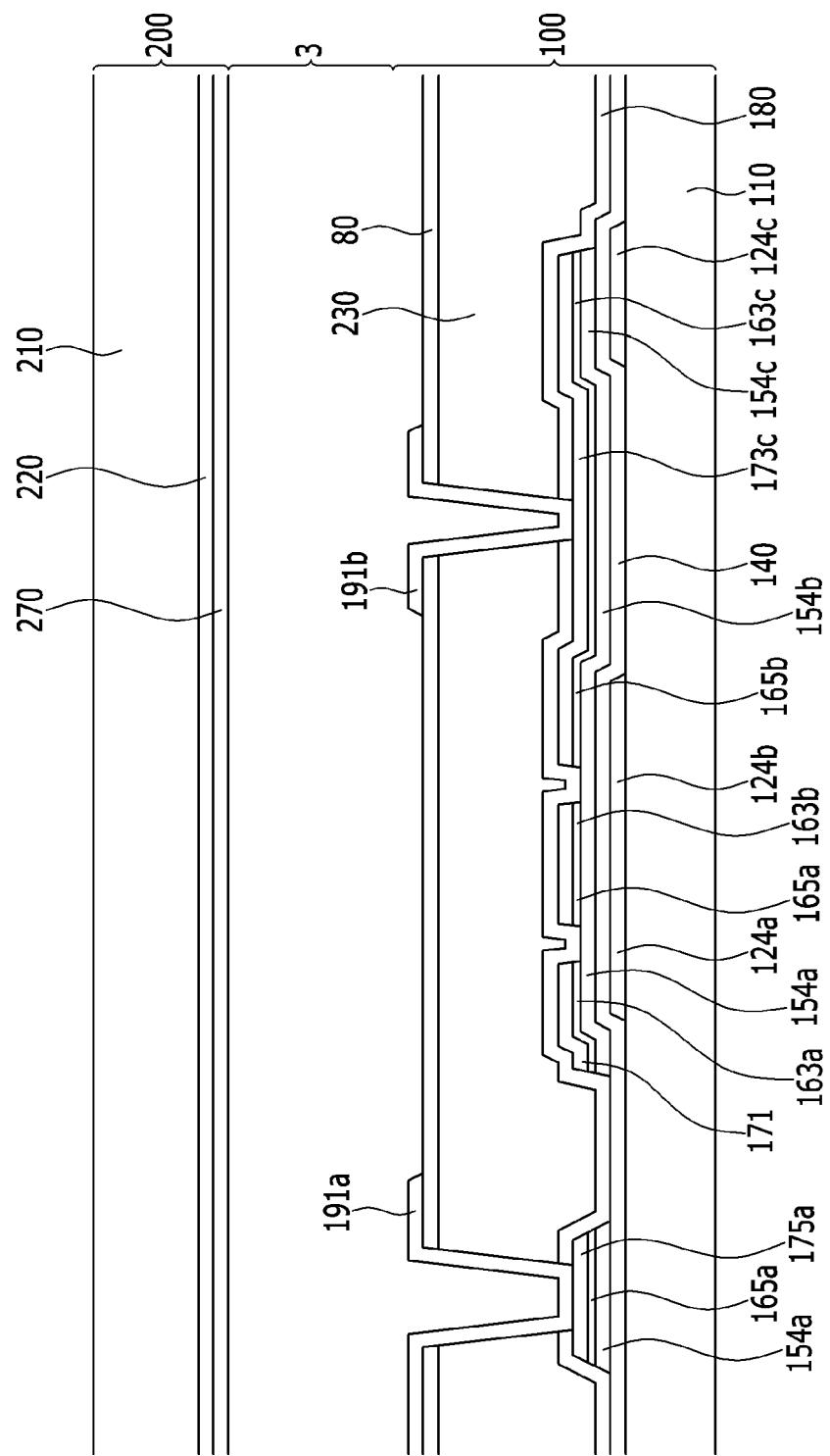
FIG. 6 shows a cross-sectional view of a liquid crystal display of FIG. 5 taken along a line VI-VI.

Referring to FIG. 5 and FIG. 6, the liquid crystal display according to the present exemplary embodiment is very similar to the liquid crystal display according to the exemplary embodiment shown in FIG. 1 and FIG. 2. Detailed descriptions of the same constituent elements will be omitted.

Referring to FIG. 5 and FIG. 6, the liquid crystal display according to the present exemplary embodiment includes a lower panel 100 and an upper panel 200 facing each other, and a liquid crystal layer 3 provided between the display panels 100 and 200.

The lower panel 100 will now be described.

A gate line 121, a reference voltage line 131, and storage electrodes (132, 133a, 133b, and 134) are formed on the first substrate 110. The gate line 121 includes a first gate electrode 124a, a second gate electrode 124b, a third gate electrode 124c, and a wide end portion (not shown) for connection to another layer or an external driving circuit, and the reference voltage line 131 has an expansion 136 and includes storage electrodes (132, 133a, 133b, and 134).

A gate insulating layer 140 is formed on the gate line 121, the reference voltage line 131, and the storage electrodes (132, 133a, 133b, and 134).

A first semiconductor 154a, a second semiconductor 154b, and a third semiconductor 154c are formed on the gate insulating layer 140.

A plurality of ohmic contacts 163a, 163b, 163c, 165a, and 165b are formed on the first semiconductor 154a, the second semiconductor 154b, and the third semiconductor 154c.

Data conductors including a data line 171, a first source electrode 173a and second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a form a first thin film transistor Qa together with the first semiconductor 154a, and a channel of the thin film transistor is formed on the semiconductor 154a provided between the first source electrode 173a and the first drain electrode 175a. Similarly, the second gate electrode 124b, the second source electrode 173b, and the second drain electrode 175b form a second thin film transistor Qb together with the second semiconductor 154b, and the channel of the thin film transistor is formed on the semiconductor 154b provided between the second source electrode 173b and the second drain electrode 175b, and the third gate electrode 124c, the third source electrode 173c, and the third drain electrode 175c form a third thin film transistor (Qc) together with the third semiconductor 154c, and the channel of the thin film transistor is formed on the semiconductor 154c provided between the third source electrode 173c and the third drain electrode 175c.

A passivation layer 180 is formed on the data conductors (171, 173a, 173b 173c. 175a, 175b, and 175c) and the exposed semiconductors 154a, 154b, and 154c.

A color filter 230 is provided on the passivation layer 180.

A capping layer 80 is provided on the color filter 230.

A pixel electrode 191 including a first subpixel electrode 191a and a second subpixel electrode 191b that are separated from each other is formed on the capping layer 80.

An overall shape of the first subpixel electrode 191a is a polygon such as a hexagon, and the first subpixel electrode 191a is surrounded by the second subpixel electrode 191b. An overall shape of the second subpixel electrode 191b is a rectangle formed with four trapezoids, and it is provided on an edge of the pixel area.

The first subpixel electrode 191a includes cross stems including a first horizontal stem 192 and a first vertical stem 193, and a plurality of first branch electrodes 194 extending from the cross stems 192 and 193.

The second subpixel electrode 191b is formed to surround an edge of the pixel area, and includes a second horizontal stem 195, two second vertical stems 196, a third vertical stem 196a, and a plurality of second branch electrodes 197 extending from the second horizontal stem 195, the second vertical stem 196, and the third vertical stem 196a. The two second vertical stems 196 are formed on two opposing edges of the pixel electrode 191, and extend in parallel with the data line. The third vertical stem 196a is provided between the two second vertical stems 196, is provided on a top center of the pixel area, and extends in parallel with the second vertical stems 196. The second branch electrodes 197 extend in four different directions.

A gap between an end of the first subpixel electrode 191a and an end of the second subpixel electrode 191b neighboring each other, that is, a separated gap between the first subpixel electrode 191a and the second subpixel electrode 191b, may be substantially 1 µm to 5 µm.

A first contact hole 185a for exposing a part of the first drain electrode 175a and a second contact hole 185b for exposing a part of the second drain electrode 175b are formed in the passivation layer 180 and the capping layer 80. A third contact hole 185c for exposing a part of the expansion 136 of the reference voltage line 131 and a part of the third drain electrode 175c are formed in the passivation layer 180, the capping layer 80, and the gate insulating layer 140, and a connecting member 95 is formed over the third contact hole 185c.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive a data voltage from the first drain electrode 175a and the second drain electrode 175b through the first contact hole 185a and the second contact hole 185b respectively.

The upper panel 200 will now be described.

A light blocking member 220 and a common electrode 270 are formed on the second substrate 210 made of transparent glass or plastic.

Alignment layers (not shown) are formed inside the display panels 100 and 200, and may be vertical alignment layers.

The liquid crystal layer 3 has negative dielectric anisotropy, and a longitudinal axis of liquid crystal molecules of the liquid crystal layer 3 is aligned perpendicular to surfaces of the display panels 100 and 200 when there is no electric field. Therefore, while there is no electric field, incident light does not pass through crossed polarizers but is blocked by the crossed polarizers.

At least one of the liquid crystal layer 3 and the alignment layer may include a photo-reactive material, in detail, a reactive mesogen.

The liquid crystal display according to the present exemplary embodiment is different from the exemplary embodiment shown in FIG. 1 and FIG. 2 regarding the shapes of the storage electrodes 132, 133a, 133b, and 134, which will now be described.

The first storage electrode 132 overlaps the first horizontal stem 192 of the first subpixel electrode 191a, and the two second storage electrodes 133a and 133b are connected to the first storage electrode 132 and overlap the two second vertical stems 196 of the second subpixel electrode 191b.

The third storage electrode 134 is connected to the reference voltage line 131 and the first storage electrode 132 and overlaps most of the first vertical stem 193 of the first subpixel electrode 191a. According to the liquid crystal display described with reference to FIG. 1 and FIG. 2, the third storage electrode 134 overlaps a lower part of the first vertical stem 193 of the first subpixel electrode 191a, and according to the liquid crystal display according to the present exemplary embodiment, the third storage electrode 134 overlaps most of the first vertical stem 193 of the first subpixel electrode 191a including the lower part and an upper part of the first vertical stem 193.

As described, a holding capacitor formed between the storage electrode, for example, the first storage electrode 132 and the third storage electrode 134, and the pixel electrode, for example, the first horizontal stem 192 and the first vertical stem 193 of the first subpixel electrode 191a may be maintained high enough to prevent crosstalk in the low gray. Further, crosstalk may be prevented in a high gray by using the first storage capacitor formed by the first subpixel electrode 191a, the first storage electrode 132, and the third storage electrode 134 overlapping each other, and a second storage capacitor formed by the second vertical stem 196 of the second subpixel electrode 191b and two second storage electrodes 133a and 133b.

A first storage electrode 132 and a third storage electrode 134 overlap the first horizontal stem 192 and the first vertical stem 193 of the first subpixel electrode 191a respectively. Two second storage electrodes 133a and 133b overlap the two second vertical stems 196 of the second subpixel electrode 191b. Storage electrodes (132, 133a, 133b, and 134) are formed on edges of a plurality of first branch electrodes 194 and a plurality of second branch electrodes 197. As described above, the storage electrodes are formed on pixel regions where the transmittance is relatively low, hence, of transmittance of the liquid crystal display may be minimized and deterioration of display quality caused by crosstalk may be prevented.

Many features of the liquid crystal display according to the above-described exemplary embodiments are applicable to the liquid crystal display according to the present exemplary embodiment.

Figure 7:
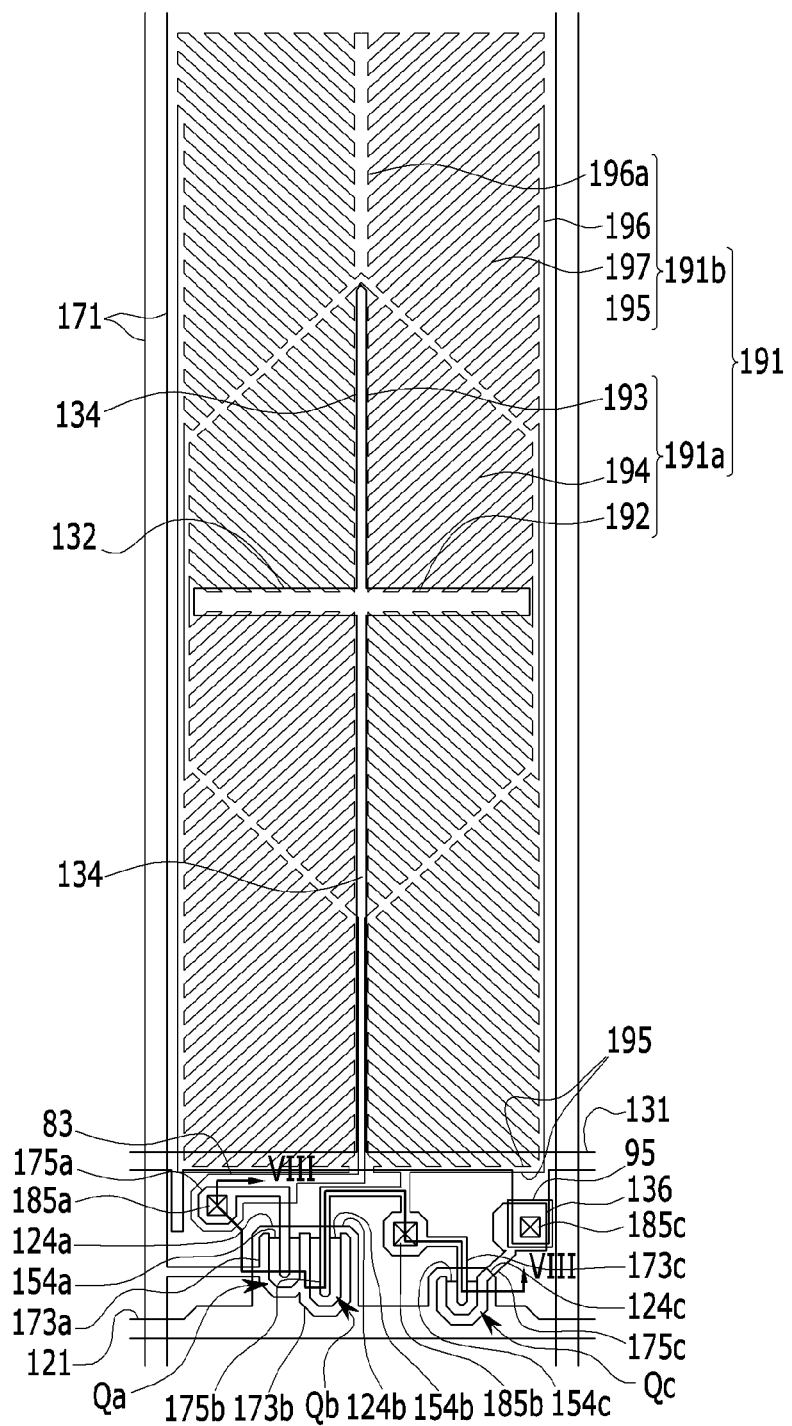
FIG. 7 shows a layout view of a liquid crystal display according to another exemplary embodiment of the inventive concept.

A liquid crystal display according to another exemplary embodiment of the inventive concept will now be described with reference to FIG. 7 and FIG. 8. FIG. 7 shows a layout view of a liquid crystal display according to another exemplary embodiment of the inventive concept, and FIG. 8 shows a cross-sectional view of a liquid crystal display of FIG. 7 taken along a line VIII-VIII.

Figure 8:
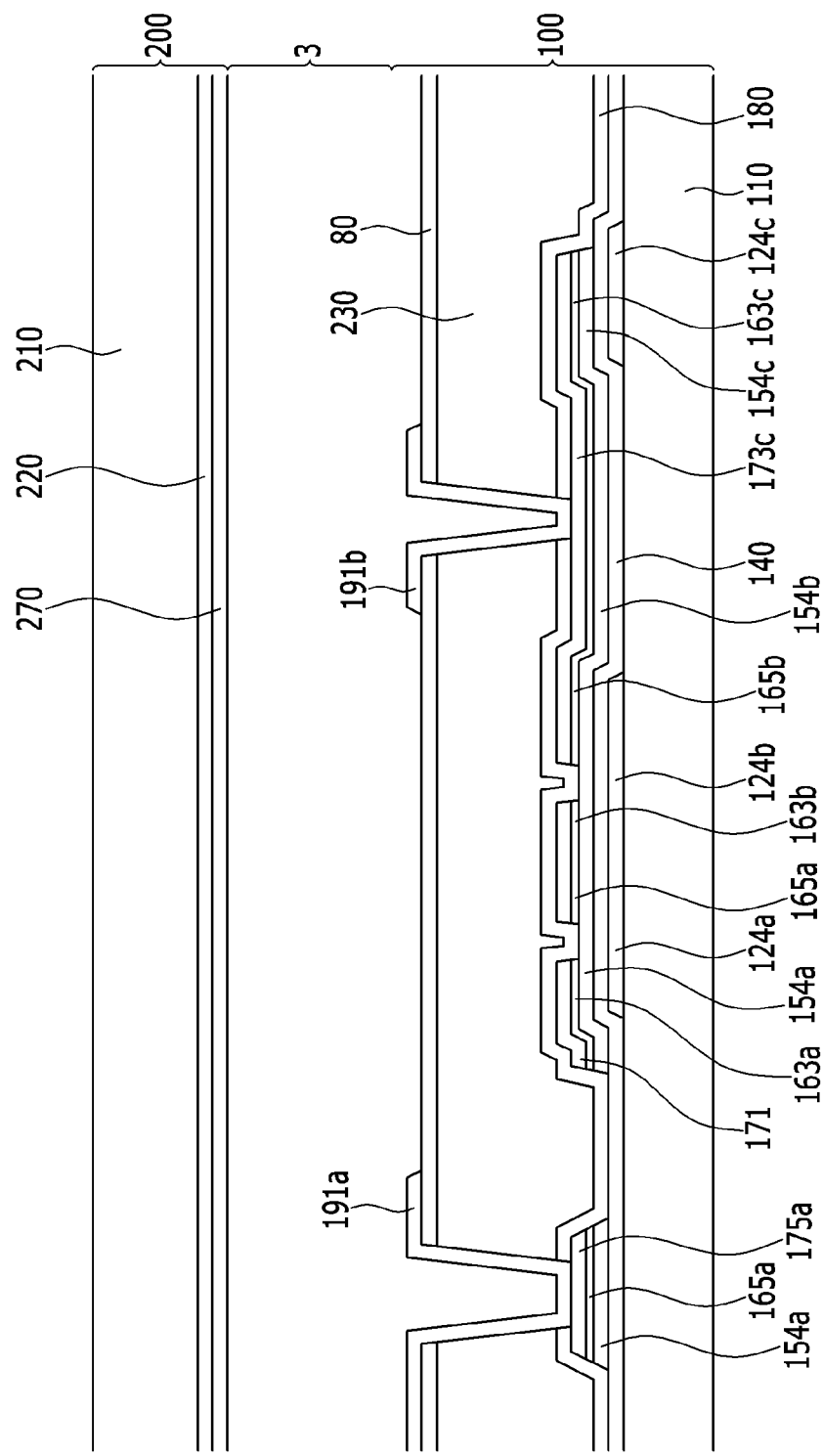
FIG. 8 shows a cross-sectional view of a liquid crystal display of FIG. 7 taken along a line VIII-VIII.

Referring to FIG. 7 and FIG. 8, the liquid crystal display according to the present exemplary embodiment is very similar to the liquid crystal display according to the exemplary embodiment shown in FIG. 1 and FIG. 2. Detailed descriptions on the same constituent elements will be omitted.

Referring to FIG. 7 and FIG. 8, the liquid crystal display according to the present exemplary embodiment includes a lower panel 100 and an upper panel 200 facing each other, and a liquid crystal layer 3 provided between the display panels 100 and 200.

The lower panel 100 will now be described.

A gate line 121, a reference voltage line 131, and storage electrodes 132 and 134 are formed on the first substrate 110. The gate line 121 includes a first gate electrode 124a, a second gate electrode 124b, a third gate electrode 124c, and a wide end portion (not shown) for connection to another layer or an external driving circuit, and the reference voltage line 131 has an expansion 136 and includes storage electrodes 132 and 134).

A gate insulating layer 140 is formed on the gate line 121, the reference voltage line 131, and the storage electrodes 132 and 134.

A first semiconductor 154a, a second semiconductor 154b, and a third semiconductor 154c are formed on the gate insulating layer 140.

A plurality of ohmic contacts 163a, 163b, 163c, 165a, and 165b are formed on the first semiconductor 154a, the second semiconductor 154b, and the third semiconductor 154c.

Data conductors including a data line 171 including a first source electrode 173a and second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a form a first thin film transistor Qa together with the first semiconductor 154a, and a channel of the thin film transistor is formed on the semiconductor 154a provided between the first source electrode 173a and the first drain electrode 175a. Similarly, the second gate electrode 124b, the second source electrode 173b, and the second drain electrode 175b form a second thin film transistor Qb together with the second semiconductor 154b, and the channel of the thin film transistor is formed on the semiconductor 154b provided between the second source electrode 173b and the second drain electrode 175b, and the third gate electrode 124c, the third source electrode 173c, and the third drain electrode 175c form a third thin film transistor (Qc) together with the third semiconductor 154c, and the channel of the thin film transistor is formed on the semiconductor 154c provided between the third source electrode 173c and the third drain electrode 175c.

A passivation layer 180 is formed on the data conductors 171, 173a, 173b 173c. 175a, 175b, and 175c and the exposed semiconductors 154a, 154b, and 154c.

A color filter 230 is provided on the passivation layer 180. A capping layer 80 is provided on the color filter 230.

A pixel electrode 191 including a first subpixel electrode 191a and a second subpixel electrode 191b that are separated from each other is formed on the capping layer 80.

An overall shape of the first subpixel electrode 191a is a polygon such as a hexagon, and the first subpixel electrode 191a is surrounded by the second subpixel electrode 191b. An overall shape of the second subpixel electrode 191b is a rectangle formed with four trapezoids, and it is provided on an edge of the pixel area.

The first subpixel electrode 191a includes cross stems 192 and 193 including a first horizontal stem 192 and a first vertical stem 193, and a plurality of first branch electrodes 194 extending from the cross stems 192 and 193.

The second subpixel electrode 191b is formed to surround an edge of the pixel area, and includes a second horizontal stem 195, two second vertical stems 196, a third vertical stem 196a, and a plurality of second branch electrodes 197 extending from the second horizontal stem 195, the second vertical stem 196, and the third vertical stem 196a. The two second vertical stems 196 are formed on two opposing edges of the pixel electrode 191 and extend in parallel with the data line. The third vertical stem 196a is provided between the two second vertical stems 196, is provided on a top center of the pixel area, and extends in parallel with the second vertical stems 196. The second branch electrodes 197 extend in four different directions.

A gap between an end of the first subpixel electrode 191a and an end of the second subpixel electrode 191b neighboring each other, that is, a separated gap between the first subpixel electrode 191a and the second subpixel electrode 191b, may be substantially 1 µm to 5 µm.

A first contact hole 185a for exposing a part of the first drain electrode 175a and a second contact hole 185b for exposing a part of the second drain electrode 175b are formed in the passivation layer 180 and the capping layer 80. A third contact hole 185c for exposing a part of the expansion 136 of the reference voltage line 131 and a part of the third drain electrode 175c is formed in the passivation layer 180, the capping layer 80, and the gate insulating layer 140, and a connecting member 95 is formed over the third contact hole 185c.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive a data voltage from the first drain electrode 175a and the second drain electrode 175b through the first contact hole 185a and the second contact hole 185b.

The upper panel 200 will now be described.

A light blocking member 220 and a common electrode 270 are formed on the second substrate 210 made of transparent glass or plastic.

Alignment layers (not shown) are formed inside the display panels 100 and 200, and may be vertical alignment layers.

The liquid crystal layer 3 has negative dielectric anisotropy, and a longitudinal axis of liquid crystal molecules of the liquid crystal layer 3 is aligned perpendicular to surfaces of the display panels 100 and 200 when there is no electric field. Therefore, while there is no electric field, incident light does not pass through crossed polarizers but is blocked by the crossed polarizers.

At least one of the liquid crystal layer 3 and the alignment layer may include a photo-reactive material, in detail, a reactive mesogen.

The liquid crystal display according to the present exemplary embodiment is different from the exemplary embodiment shown in FIG. 1 and FIG. 2 regarding the shapes of the storage electrodes 132, 133a, 133b, and 134, which will now be described.

The first storage electrode 132 overlaps the first horizontal stem 192 of the first subpixel electrode 191a, and the third storage electrode 134 is connected to the reference voltage line 131 and the first storage electrode 132 and overlaps of the upper part and the lower part of the first vertical stem 193 of the first subpixel electrode 191a. Two second storage electrodes 133a and 133b overlapping the two second vertical stems 196 of the second subpixel electrode 191b shown in the FIG. 1 are omitted.

The third storage electrode 134 overlaps the upper part and the lower part of the first vertical stem 193 of the first subpixel electrode 191a according to the present exemplary embodiment, while the third storage electrode 134 overlaps only a lower part of the first vertical stem 193 of the first subpixel electrode 191a according to the exemplary embodiment described with reference to FIG. 1 and FIG. 2. Further, two second storage electrodes 133a and 133b overlapping the two second vertical stems 196 of the second subpixel electrode 191b shown in the FIG. 1 are omitted.

As described, a holding capacitor formed between the storage electrode, for example, the first storage electrode 132 and the third storage electrode 134, and the pixel electrode, for example, the first horizontal stem 192 and the first vertical stem 193 of the first subpixel electrode 191a may be maintained high enough to prevent crosstalk in a low gray.

The storage electrodes 132 and 134 are formed on pixel regions in which pixel transmittance is relatively low, hence, deterioration of transmittance of the liquid crystal display may be minimized and deterioration of display quality caused by crosstalk may be prevented.

Many features of the liquid crystal display according to the above-described exemplary embodiments are applicable to the liquid crystal display according to the present exemplary embodiment.

Figure 9:
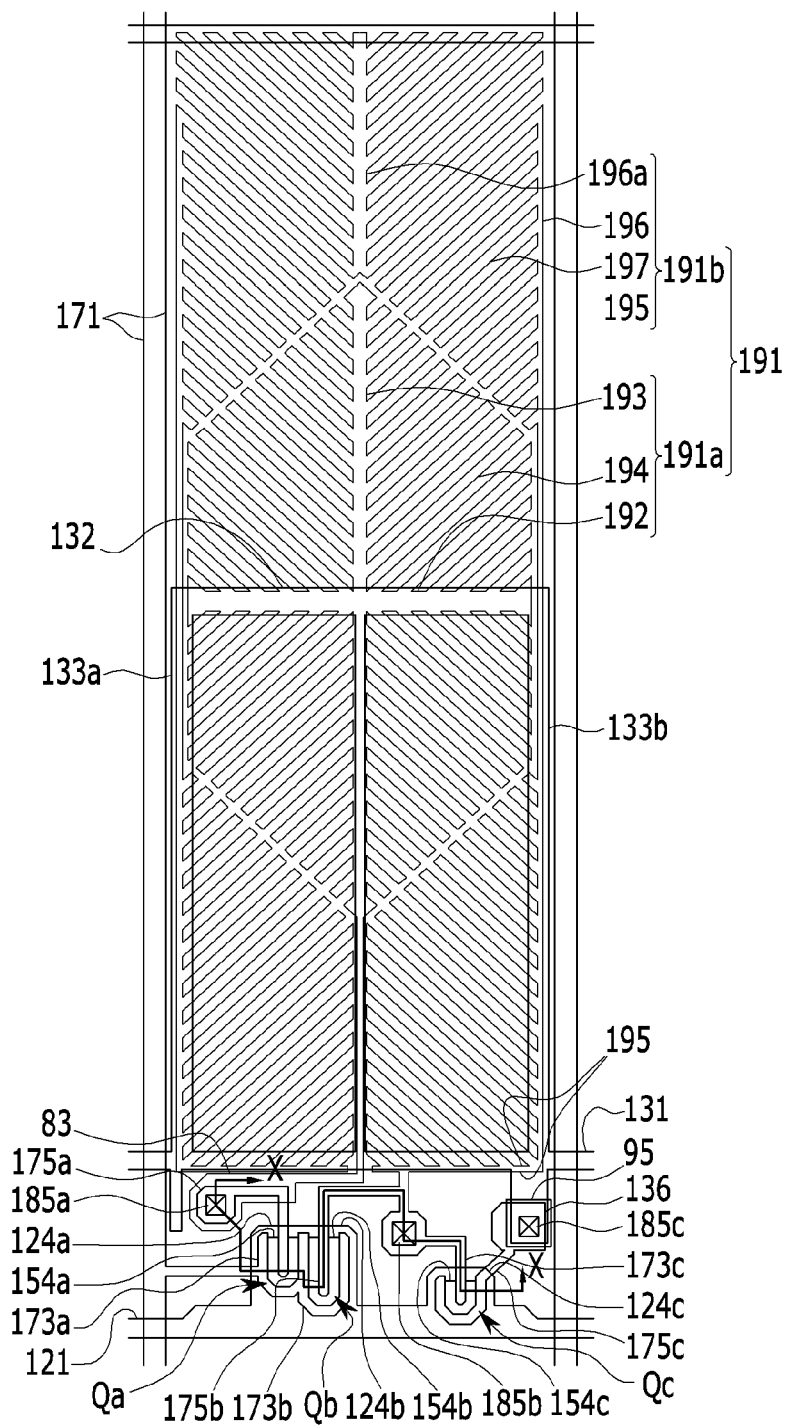
FIG. 9 shows a layout view of a liquid crystal display according to another exemplary embodiment of the inventive concept.

A liquid crystal display according to another exemplary embodiment of the inventive concept will now be described with reference to FIG. 9 and FIG. 10. FIG. 9 shows a layout view of a liquid crystal display according to another exemplary embodiment of the inventive concept and FIG. 10 shows a cross-sectional view of a liquid crystal display of FIG. 9 taken along a line X-X.

Figure 10:
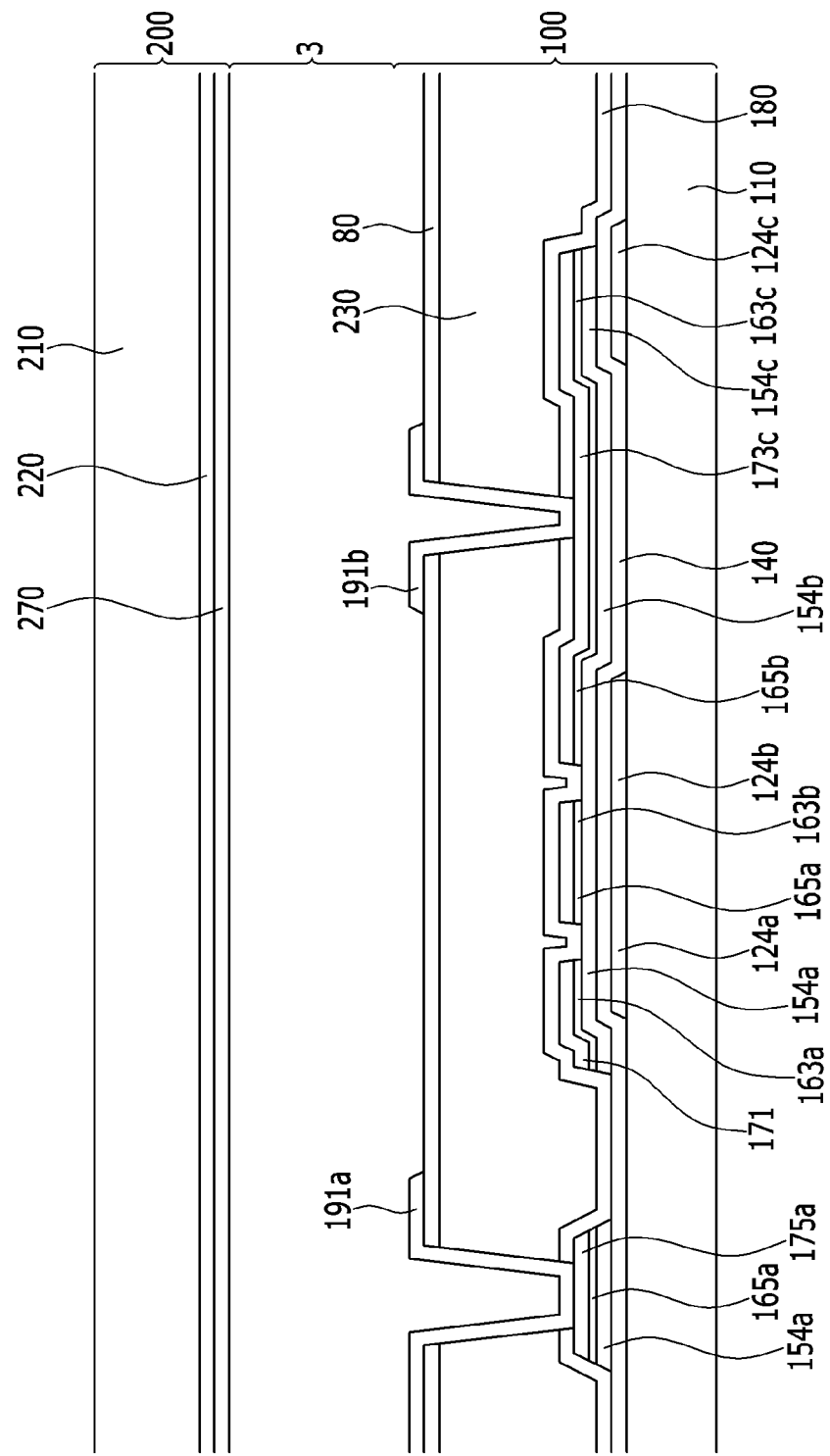
FIG. 10 shows a cross-sectional view of a liquid crystal display of FIG. 9 taken along a line X-X.

Referring to FIG. 9 and FIG. 10, the liquid crystal display according to the present exemplary embodiment is very similar to the liquid crystal display according to the exemplary embodiment shown in FIG. 1 and FIG. 2. Detailed descriptions of the same constituent elements will be omitted.

Referring to FIG. 9 and FIG. 10, the liquid crystal display according to the present exemplary embodiment includes a lower panel 100 and an upper panel 200 facing each other, and a liquid crystal layer 3 provided between the display panels 100 and 200.

The lower panel 100 will now be described.

A gate line 121, a reference voltage line 131, and storage electrodes 132, 133a, and 133b are formed on the first substrate 110. The gate line 121 includes a first gate electrode 124a, a second gate electrode 124b, a third gate electrode 124c, and a wide end portion (not shown) for an access to another layer or an external driving circuit, and the reference voltage line 131 has an expansion 136 and includes storage electrodes 132, 133a, and 133b.

A gate insulating layer 140 is formed on the gate line 121, the reference voltage line 131, and the storage electrodes 132, 133a, and 133b.

A first semiconductor 154a, a second semiconductor 154b, and a third semiconductor 154c are formed on the gate insulating layer 140.

A plurality of ohmic contacts 163a, 163b, 163c, 165a, and 165b are formed on the first semiconductor 154a, the second semiconductor 154b, and the third semiconductor 154c.

Data conductors including a data line 171, a first source electrode 173a and second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a form a first thin film transistor Qa together with the first semiconductor 154a, and a channel of the thin film transistor is formed on the semiconductor 154a provided between the first source electrode 173a and the first drain electrode 175a. Similarly, the second gate electrode 124b, the second source electrode 173b, and the second drain electrode 175b form a second thin film transistor Qb together with the second semiconductor 154b, and the channel of the thin film transistor is formed on the semiconductor 154b provided between the second source electrode 173b and the second drain electrode 175b, and the third gate electrode 124c, the third source electrode 173c, and the third drain electrode 175c form a third thin film transistor (Qc) together with the third semiconductor 154c, and the channel of the thin film transistor is formed on the semiconductor 154c provided between the third source electrode 173c and the third drain electrode 175c.

A passivation layer 180 is formed on the data conductors 171, 173a, 173b 173c. 175a, 175b, and 175c and the exposed semiconductors 154a, 154b, and 154c.

A color filter 230 is provided on the passivation layer 180.

A capping layer 80 is provided on the color filter 230.

A pixel electrode 191 including a first subpixel electrode 191a and a second subpixel electrode 191b that are separated from each other is formed on the capping layer 80.

An overall shape of the first subpixel electrode 191a is a polygon such as a hexagon, and the first subpixel electrode 191a is surrounded by the second subpixel electrode 191b. An overall shape of the second subpixel electrode 191b is a rectangle formed with four trapezoids, and it is provided on an edge of the pixel area.

The first subpixel electrode 191a includes cross stems 192 and 193 including a first horizontal stem 192 and a first vertical stem 193, and a plurality of first branch electrodes 194 extending from the cross stems 192 and 193.

The second subpixel electrode 191b is formed to surround an edge of the pixel area, and includes a second horizontal stem 195, two second vertical stems 196, a third vertical stem 196a, and a plurality of second branch electrodes 197 extending from the second horizontal stem 195, the second vertical stem 196, and the third vertical stem 196a. The two second vertical stems 196 are formed on two opposing edges of the pixel electrode 191 and extend in parallel with the data line. The third vertical stem 196a is provided between the two second vertical stems 196, is provided on a top center of the pixel area, and extends in parallel with the second vertical stems 196. The second branch electrodes 197 extend in four different directions.

A gap between an end of the first subpixel electrode 191a and an end of the second subpixel electrode 191b neighboring each other, that is, a separated gap between the first subpixel electrode 191a and the second subpixel electrode 191b, may be substantially 1 µm to 5 µm.

A first contact hole 185a for exposing a part of the first drain electrode 175a and a second contact hole 185b for exposing a part of the second drain electrode 175b are formed in the passivation layer 180 and the capping layer 80. A third contact hole 185c for exposing a part of the expansion 136 of the reference voltage line 131 and a part of the third drain electrode 175c is formed in the passivation layer 180, the capping layer 80, and the gate insulating layer 140, and a connecting member 95 is formed over the third contact hole 185c.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive a data voltage from the first drain electrode 175a and the second drain electrode 175b through the first contact hole 185a and the second contact hole 185b.

The upper panel 200 will now be described.

A light blocking member 220 and a common electrode 270 are formed on the second substrate 210 made of transparent glass or plastic.

Alignment layers (not shown) are formed inside the display panels 100 and 200, and may be vertical alignment layers.

The liquid crystal layer 3 has negative dielectric anisotropy, and a longitudinal axis of liquid crystal molecules of the liquid crystal layer 3 is aligned perpendicular to surfaces of the display panels 100 and 200 when there is no electric field. Therefore, while there is no electric field, incident light does not pass through crossed polarizers but is blocked by the crossed polarizers.

At least one of the liquid crystal layer 3 and the alignment layer may include a photo-reactive material, in detail, a reactive mesogen.

The liquid crystal display according to the present exemplary embodiment is different from the exemplary embodiment shown in FIG. 1 and FIG. 2 regarding the shapes of the storage electrodes 132, 133a, and 133b, which will now be described.

The first storage electrode 132 overlaps the first horizontal stem 192 of the first subpixel electrode 191a, and the two second storage electrodes 133a and 133b extend from the reference voltage line 131 are connected to the first storage electrode 132, and overlap the two second vertical stems 196 of the second subpixel electrode 191b. The two second storage electrodes 133a and 133b respectively overlap lower parts of the two second vertical stems 196.

Differing from the liquid crystal display according to the exemplary embodiment described with reference to FIG. 1 and FIG. 2, the second storage electrode 133a and 133b overlapping second vertical stem 196 corresponding to an upper part of the first subpixel electrode 191a is omitted, and the two second storage electrodes 133a and 133b extend from the reference voltage line 131 are connected to the first storage electrode 132, and overlap lower parts of the two second vertical stems 196 of the second subpixel electrode 191b.

As described, a holding capacitor formed between the pixel electrode, for example the first horizontal stem 192 and the first vertical stem 193, and the storage electrode, for example, the first storage electrode 132 and the third storage electrode 134 may be maintained high enough to prevent crosstalk in the low gray. Further, crosstalk may be prevented in the high gray by using the second storage capacitor formed when the second vertical stem 196 of the second subpixel electrode 191b overlaps the two second storage electrodes 133a and 133b together with the first storage capacitor.

A first storage electrode 132 and the third storage electrode 134 overlap the first horizontal stem 192 and the first vertical stem 193 of the first subpixel electrode 191a respectively. Two second storage electrodes 133a and 133b overlap the two second vertical stems 196 of the second subpixel electrode 191b. Storage electrodes (132, 133a, and 133b) are formed on edges of a plurality of first branch electrodes 194 and a plurality of second branch electrodes 197. As described above, the storage electrodes are formed on pixel regions where the transmittance is relatively low, hence, deterioration of transmittance of the liquid crystal display may be minimized and deterioration of display quality caused by crosstalk may be prevented.

Many features of the liquid crystal display according to the above-described exemplary embodiments are applicable to the liquid crystal display according to the present exemplary embodiment.

Figure 11:
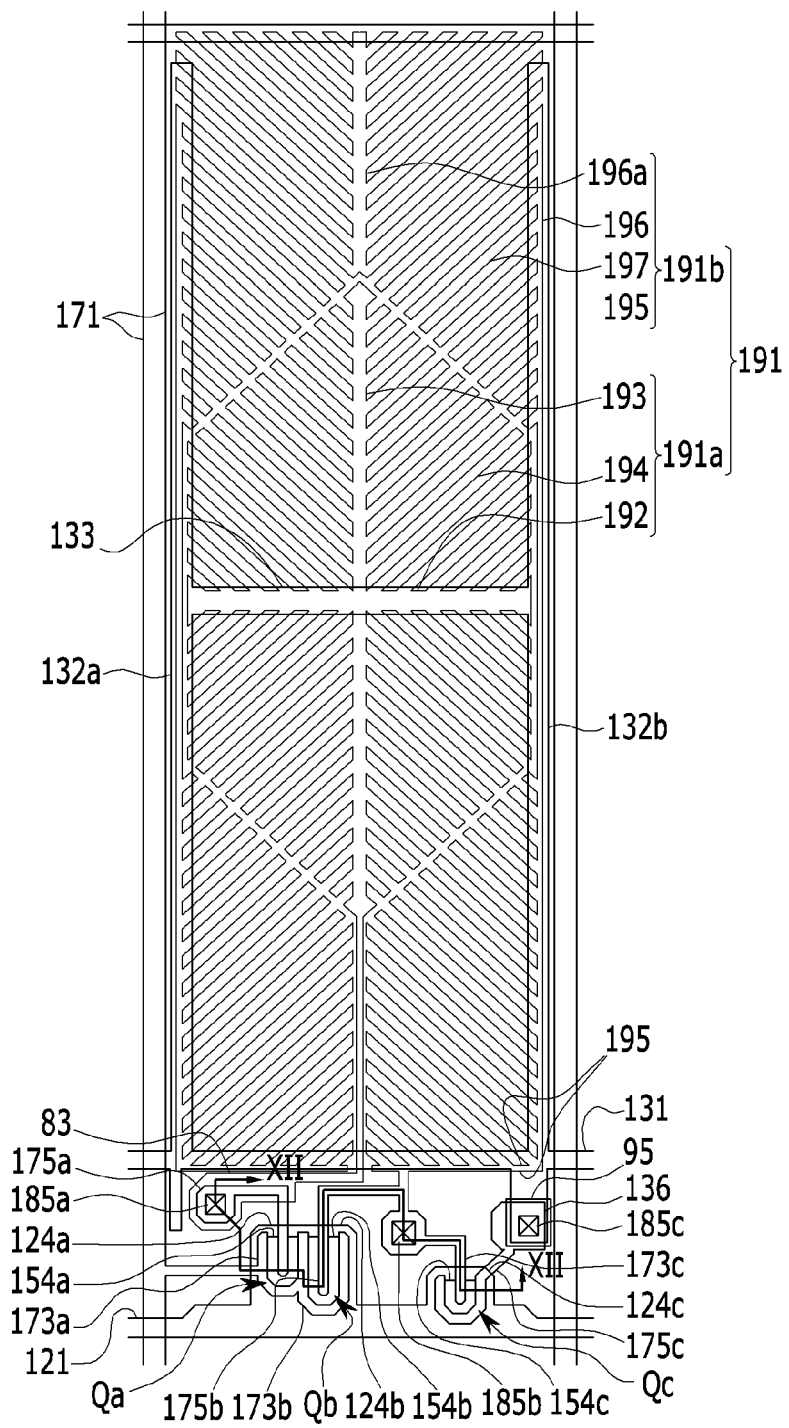
FIG. 11 shows a layout view of a liquid crystal display according to another exemplary embodiment of the inventive concept.
Figure 12:
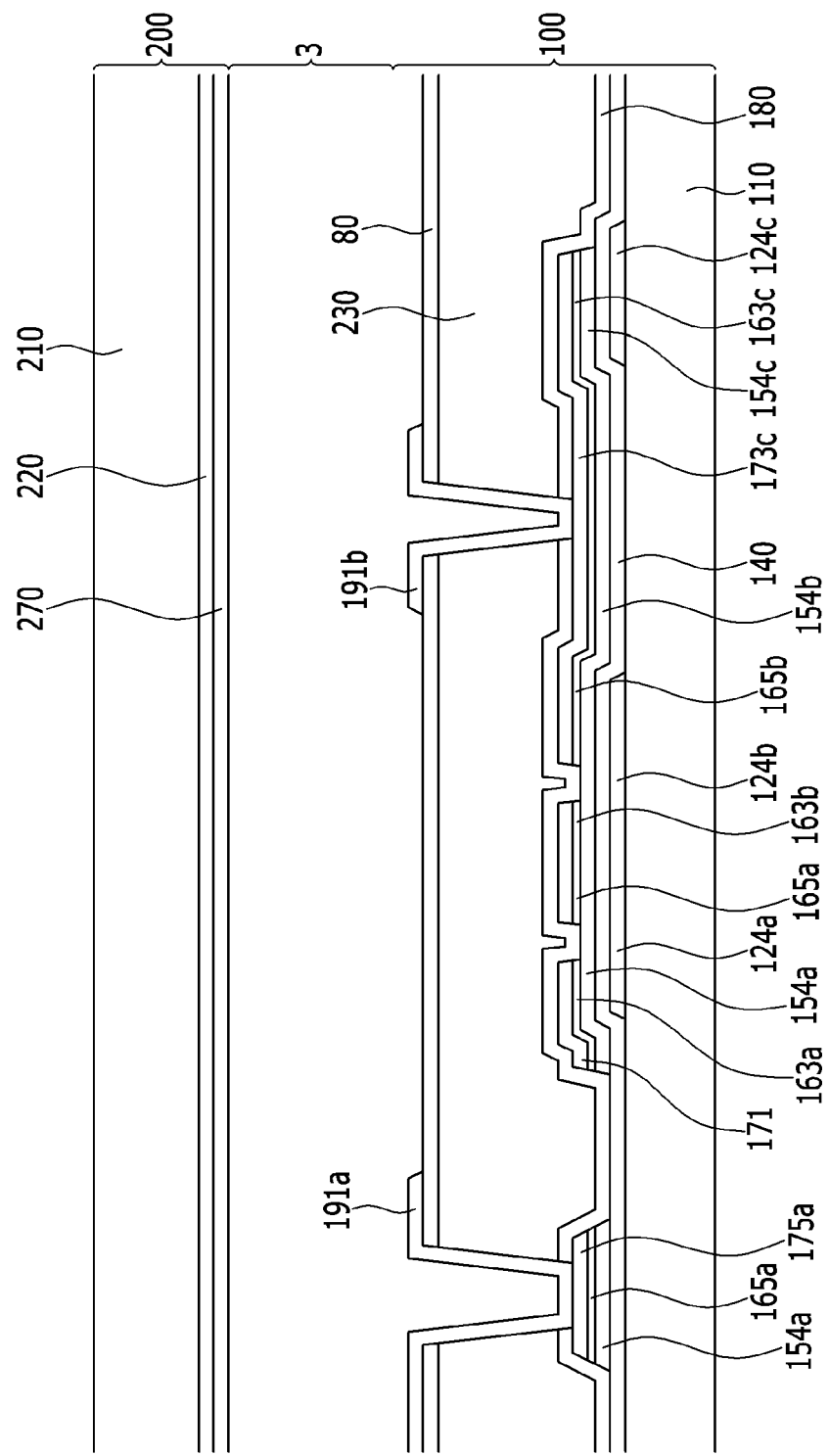
FIG. 12 shows a cross-sectional view of a liquid crystal display of FIG. 11 taken along a line XII-XII.

Referring to FIG. 11 and FIG. 12, a liquid crystal display according to another exemplary embodiment of the inventive concept will now be described. FIG. 11 shows a layout view of a liquid crystal display according to another exemplary embodiment of the inventive concept, and FIG. 12 shows a cross-sectional view of a liquid crystal display of FIG. 11 taken along a line XII-XII.

Referring to FIG. 11 and FIG. 12, the liquid crystal display according to the present exemplary embodiment is very similar to the liquid crystal display according to the exemplary embodiment shown in FIG. 1 and FIG. 2. Detailed descriptions on the same constituent elements will be omitted.

Referring to FIG. 11 and FIG. 12, the liquid crystal display according to the present exemplary embodiment includes a lower panel 100 and an upper panel 200 facing each other, and a liquid crystal layer 3 provided between the display panels 100 and 200.

The lower panel 100 will now be described.

A gate line 121, a reference voltage line 131, and storage electrodes 132, 133a, and 133b are formed on the first substrate 110. The gate line 121 includes a first gate electrode 124a, a second gate electrode 124b, a third gate electrode 124c, and a wide end portion (not shown) for connection to another layer or an external driving circuit, and the reference voltage line 131 has an expansion 136 and includes storage electrodes 132, 133a, and 133b.

A gate insulating layer 140 is formed on the gate line 121, the reference voltage line 131, and the storage electrodes 132, 133a, and 133b.

A first semiconductor 154a, a second semiconductor 154b, and a third semiconductor 154c are formed on the gate insulating layer 140.

A plurality of ohmic contacts 163a, 163b, 163c, 165a, and 165b, 165c are formed on the first semiconductor 154a, the second semiconductor 154b, and the third semiconductor 154c.

Data conductors including a data line 171, a first source electrode 173a and second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a form a first thin film transistor Qa together with the first semiconductor 154a, and a channel of the thin film transistor is formed on the semiconductor 154a provided between the first source electrode 173a and the first drain electrode 175a. Similarly, the second gate electrode 124b, the second source electrode 173b, and the second drain electrode 175b form a second thin film transistor Qb together with the second semiconductor 154b, and the channel of the thin film transistor is formed on the semiconductor 154b provided between the second source electrode 173b and the second drain electrode 175b, and the third gate electrode 124c, the third source electrode 173c, and the third drain electrode 175c form a third thin film transistor (Qc) together with the third semiconductor 154c, and the channel of the thin film transistor is formed on the semiconductor 154c provided between the third source electrode 173c and the third drain electrode 175c.

A passivation layer 180 is formed on the data conductors 171, 173a, 173b 173c. 175a, 175b, and 175c and the exposed semiconductors 154a, 154b, and 154c.

A color filter 230 is provided on the passivation layer 180.

A capping layer 80 is provided on the color filter 230.

A pixel electrode 191 including a first subpixel electrode 191a and a second subpixel electrode 191b that are separated from each other is formed on the capping layer 80.

An overall shape of the first subpixel electrode 191a is a polygon such as a hexagon, and the first subpixel electrode 191a is surrounded by the second subpixel electrode 191b. An overall shape of the second subpixel electrode 191b is a rectangle formed with four trapezoids, and it is provided on an edge of the pixel area.

The first subpixel electrode 191a includes cross stems 192 and 193 including a first horizontal stem 192 and a first vertical stem 193, and a plurality of first branch electrodes 194 extending from the cross stems 192 and 193.

The second subpixel electrode 191b is formed to surround an edge of the pixel area, and includes a second horizontal stem 195, two second vertical stems 196, a third vertical stem 196a, and a plurality of second branch electrodes 197 extending from the second horizontal stem 195, the second vertical stem 196, and the third vertical stem 196a. The two second vertical stems 196 are formed on two opposing edges of the pixel electrode 191 and extend in parallel with the data line. The third vertical stem 196a is provided between the two second vertical stems 196, is provided on a top center of the pixel area, and extends in parallel with the second vertical stems 196. The second branch electrodes 197 extend in four different directions.

A gap between an end of the first subpixel electrode 191a and an end of the second subpixel electrode 191b neighboring each other, that is, a separated gap between the first subpixel electrode 191a and the second subpixel electrode 191b, may be substantially 1 μm to 5 μm.

A first contact hole 185a for exposing a part of the first drain electrode 175a and a second contact hole 185b for exposing a part of the second drain electrode 175b are formed in the passivation layer 180 and the capping layer 80. A third contact hole 185c for exposing a part of the expansion 136 of the reference voltage line 131 and a part of the third drain electrode 175c is formed in the passivation layer 180, the capping layer 80, and the gate insulating layer 140, and a connecting member 95 is formed over the third contact hole 185c.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive a data voltage from the first drain electrode 175a and the second drain electrode 175b through the first contact hole 185a and the second contact hole 185b.

The upper panel 200 will now be described.

A light blocking member 220 and a common electrode 270 are formed on the second substrate 210 made of transparent glass or plastic.

Alignment layers (not shown) are formed inside the display panels 100 and 200, and may be vertical alignment layers.

The liquid crystal layer 3 has negative dielectric anisotropy, and a longitudinal axis of liquid crystal molecules of the liquid crystal layer 3 is aligned perpendicular to surfaces of the display panels 100 and 200 when there is no electric field. Therefore, while there is no electric field, incident light does not pass through crossed polarizers but is blocked by the crossed polarizers.

At least one of the liquid crystal layer 3 and the alignment layer may include a photo-reactive material, in detail, a reactive mesogen.

The liquid crystal display according to the present exemplary embodiment is different from the exemplary embodiment shown in FIG. 1 and FIG. 2 regarding the shapes of the storage electrodes 132, 133a, and 133b, which will now be described.

The first storage electrode 132 overlaps the first horizontal stem 192 of the first subpixel electrode 191a, and the two second storage electrodes 133a and 133b extend from the reference voltage line 131 and are connected to the first storage electrode 132, and overlap the two second vertical stems 196 of the second subpixel electrode 191b. The two second storage electrodes 133a and 133b respectively overlap most parts of the two second vertical stems 196.

Differing from the liquid crystal display according to the exemplary embodiment described with reference to FIG. 1 and FIG. 2, the third storage electrode overlapping a part of the first vertical stem 193 of the first subpixel electrode 191a is omitted, the two second storage electrodes 133a and 133b extend from the reference voltage line 131 are connected to the first storage electrode 132 and overlap most parts of the two second vertical stems 196 of the second subpixel electrode 191b.

As described, a holding capacitor formed between the first storage electrode 132 and the first horizontal stem 192 of the first subpixel electrode 191a may be maintained high enough to prevent crosstalk in the low gray. Further, crosstalk may be prevented in the high gray by using the second storage capacitor formed when the second vertical stem 196 of the second subpixel electrode 191b overlaps the two second storage electrodes 133a and 133b together with the first storage capacitor.

A first storage electrode 132 overlaps the first horizontal stem 192 of the first subpixel electrode 191a. Two second storage electrodes 133a and 133b overlap the two second vertical stems 196 of the second subpixel electrode 191b. Storage electrodes (132, 133a, and 133b) are formed on edges of a plurality of first branch electrodes 194 and a plurality of second branch electrodes 197. As described above, the storage electrodes are formed on pixel regions where the transmittance is relatively low, hence, deterioration of transmittance of the liquid crystal display may be minimized and deterioration of display quality caused by crosstalk may be prevented.

Many features of the liquid crystal display according to the above-described exemplary embodiments are applicable to the liquid crystal display according to the present exemplary embodiment.

Figure 13:
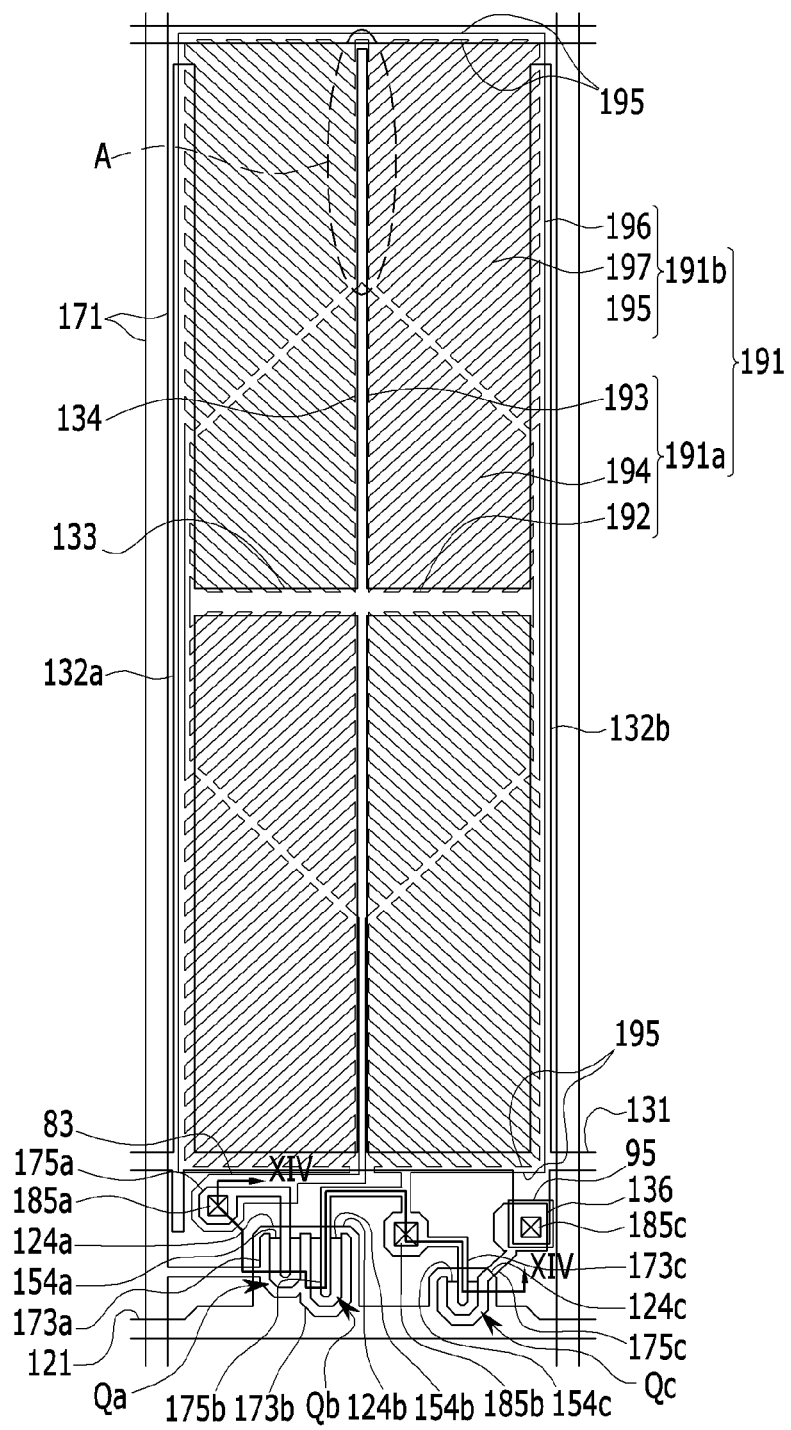
FIG. 13 shows a layout view of a liquid crystal display according to another exemplary embodiment of the inventive concept.
Figure 14:
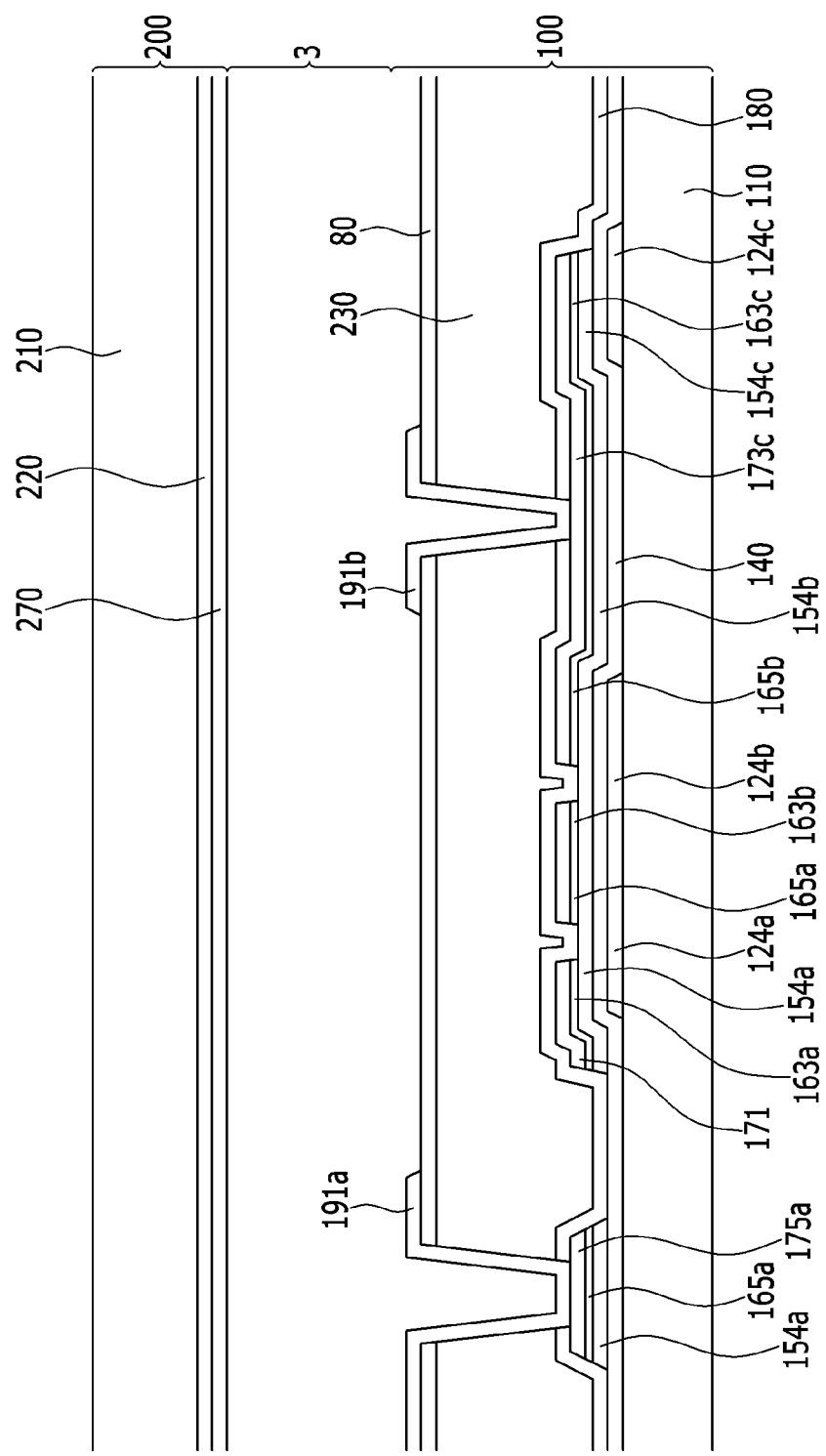
FIG. 14 shows a cross-sectional view of a liquid crystal display of FIG. 13 taken along a line XIV-XIV.

Referring to FIG. 13 and FIG. 14, a liquid crystal display according to another exemplary embodiment of the inventive concept will now be described. FIG. 13 shows a layout view of a liquid crystal display according to another exemplary embodiment of the inventive concept, and FIG. 14 shows a cross-sectional view of a liquid crystal display of FIG. 13 taken along a line XIV-XIV.

Referring to FIG. 13 and FIG. 14, the liquid crystal display according to the present exemplary embodiment is very similar to the liquid crystal display according to the exemplary embodiment shown in FIG. 1 and FIG. 2. Detailed descriptions of the same constituent elements will be omitted.

Referring to FIG. 13 and FIG. 14, the liquid crystal display according to the present exemplary embodiment includes a lower panel 100 and an upper panel 200 facing each other, and a liquid crystal layer 3 provided between the display panels 100 and 200.

The lower panel 100 will now be described.

A gate line 121, a reference voltage line 131, and storage electrodes 132, 133a, 133b, and 134 are formed on the first substrate 110. The gate line 121 includes a first gate electrode 124a, a second gate electrode 124b, a third gate electrode 124c, and a wide end portion (not shown) for connection to another layer or an external driving circuit, and the reference voltage line 131 has an expansion 136 and includes storage electrodes 132, 133a, 133b, and 134.

A gate insulating layer 140 is formed on the gate line 121, the reference voltage line 131, and the storage electrodes 132, 133a, and 133b.

A first semiconductor 154a, a second semiconductor 154b, and a third semiconductor 154c are formed on the gate insulating layer 140.

A plurality of ohmic contacts 163a, 163b, 163c, 165a, and 165b are formed on the first semiconductor 154a, the second semiconductor 154b, and the third semiconductor 154c.

Data conductors including a data line 171, a first source electrode 173a and second source electrode 173b, a first drain electrode 175a, a second drain electrode 175b, a third source electrode 173c, and a third drain electrode 175c are formed on the ohmic contacts 163a, 163b, 163c, 165a, and 165b and the gate insulating layer 140. The second drain electrode 175b is connected to the third source electrode 173c.

The first gate electrode 124a, the first source electrode 173a, and the first drain electrode 175a form a first thin film transistor Qa together with the first semiconductor 154a, and a channel of the thin film transistor is formed on the semiconductor 154a provided between the first source electrode 173a and the first drain electrode 175a. Similarly, the second gate electrode 124b, the second source electrode 173b, and the second drain electrode 175b form a second thin film transistor Qb together with the second semiconductor 154b, and the channel of the thin film transistor is formed on the semiconductor 154b provided between the second source electrode 173b and the second drain electrode 175b, and the third gate electrode 124c, the third source electrode 173c, and the third drain electrode 175c form a third thin film transistor (Qc) together with the third semiconductor 154c, and the channel of the thin film transistor is formed on the semiconductor 154c provided between the third source electrode 173c and the third drain electrode 175c.

A passivation layer 180 is formed on the data conductors 171, 173a, 173b 173c. 175a, 175b, and 175c and the exposed semiconductors 154a, 154b, and 154c.

A color filter 230 is provided on the passivation layer 180.

A capping layer 80 is provided on the color filter 230.

A pixel electrode 191 including a first subpixel electrode 191a and a second subpixel electrode 191b that are separated from each other is formed on the capping layer 80.

An overall shape of the first subpixel electrode 191a is a polygon such as a hexagon, and the first subpixel electrode 191a is surrounded by the second subpixel electrode 191b. An overall shape of the second subpixel electrode 191b is a rectangle formed with four trapezoids, and it is provided on an edge of the pixel area.

The first subpixel electrode 191a includes cross stems 192 and 193 including a first horizontal stem 192 and a first vertical stem 193, and a plurality of first branch electrodes 194 extending from the cross stems 192 and 193.

The first vertical stem 193 of the first subpixel electrode 191a extends between the second branch electrodes 197 of the second subpixel electrode 191b. As shown in the part A of FIG. 13, the third vertical stem 193a of the second subpixel electrode 191b is removed from a portion to which the third storage electrode 134 extends, and the first vertical stem 193 of the first subpixel electrode 191a extends to the portion. The third storage electrode 134 overlaps most of the first vertical stem 193 of the first subpixel electrode 191a, and extends along the center of the pixel area.

The second subpixel electrode 191b is formed to surround the edge of the pixel area, and includes a second horizontal stem 195, two second vertical stems 196, and a plurality of second branch electrodes 197 extending from the second horizontal stem 195 and the second vertical stems 196. The two second vertical stems 196 extend in parallel with two opposing edges of the pixel electrode 191.

A gap between an end of the first subpixel electrode 191a and an end of the second subpixel electrode 191b neighboring each other, that is, a separated gap between the first subpixel electrode 191a and the second subpixel electrode 191b, may be substantially 1 μm to 5 μm.

A first contact hole 185a for exposing a part of the first drain electrode 175a and a second contact hole 185b for exposing a part of the second drain electrode 175b are formed in the passivation layer 180 and the capping layer 80. A third contact hole 185c for exposing a part of the expansion 136 of the reference voltage line 131 and a part of the third drain electrode 175c is formed in the passivation layer 180, the capping layer 80, and the gate insulating layer 140, and a connecting member 95 is formed over the third contact hole 185c.

The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b receive a data voltage from the first drain electrode 175a and the second drain electrode 175b through the first contact hole 185a and the second contact hole 185b.

The upper panel 200 will now be described.

A light blocking member 220 and a common electrode 270 are formed on the second substrate 210 made of transparent glass or plastic.

An alignment layer (not shown) is formed inside the display panels 100 and 200, and may be vertical alignment layers.

The liquid crystal layer 3 has negative dielectric anisotropy, and a longitudinal axis of liquid crystal molecules of the liquid crystal layer 3 is aligned perpendicular to surfaces of the display panels 100 and 200 when there is no electric field. Therefore, while there is no electric field, incident light does not pass through crossed polarizers but is blocked by the crossed polarizers.

At least one of the liquid crystal layer 3 and the alignment layer may include a photo-reactive material, in detail, a reactive mesogen.

However, the liquid crystal display according to the present exemplary embodiment is different from the exemplary embodiment shown with reference to FIG. 1 and FIG. 2 regarding the storage electrodes (132, 133a, 133b, and 134), which will now be described.

The first storage electrode 132 overlaps the first horizontal stem 192 of the first subpixel electrode 191a, and the two second storage electrodes 133a and 133b are connected to the first storage electrode 132 and overlap the two second vertical stems 196 of the second subpixel electrode 191b.

The third storage electrode 134 is connected to the reference voltage line 131 and the first storage electrode 132, and overlaps most of the first vertical stem 193 of the first subpixel electrode 191a. The third storage electrode 134 overlaps a lower part of the first vertical stem 193 of the first subpixel electrode 191a according to the exemplary embodiment described with reference to FIG. 1 and FIG. 2, and the third storage electrode 134 overlaps most of the first vertical stem 193 of the first subpixel electrode 191a according to the present exemplary embodiment. Further, the first vertical stem 193 of the first subpixel electrode 191a extends along the center portion of the pixel area to a lower edge and an upper edge of the pixel electrode 191.

Also, the two second storage electrodes 133a and 133b of the liquid crystal display according to the present exemplary embodiment extending from the reference voltage line 131 are connected to the first storage electrode 132, and overlap most parts of the two second vertical stems 196 of the second subpixel electrode 191b.

As described, a holding capacitor formed between the storage electrode, for example, the first storage electrode 132 and the third storage electrode 134, and the pixel electrode, for example, the first horizontal stem 192 and the first vertical stem 193 of the first subpixel electrode 191a may be maintained high enough to prevent crosstalk in a low gray. Further, crosstalk may be prevented in a high gray by using the first storage capacitor formed by the first subpixel electrode 191a, the first storage electrode 132, and the third storage electrode 134 overlapping each other and a second storage capacitor formed by the second vertical stem 196 of the second subpixel electrode 191b and two second storage electrodes 133a and 133b.

A first storage electrode 132 and a third storage electrode 134 overlap the first horizontal stem 192 and the first vertical stem 193 of the first subpixel electrode 191a. Two second storage electrodes 133a and 133b overlap the two second vertical stems 196 of the second subpixel electrode 191b. Storage electrodes (132, 133a, 133b, and 134) are formed on edges of a plurality of first branch electrodes 194 and a plurality of second branch electrodes 197. As described above, the storage electrodes are formed on pixel regions where the transmittance is relatively low, hence, deterioration of transmittance of the liquid crystal display may be minimized and deterioration of display quality caused by crosstalk may be prevented.

Many features of the liquid crystal display according to the above-described exemplary embodiments are applicable to the liquid crystal display according to the present exemplary embodiment.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:
1. A liquid crystal display comprising:
a first substrate;
a reference voltage line formed on the first substrate and including a storage electrode;
a pixel electrode including a first subpixel electrode and a second subpixel electrode formed on a same plane on the first substrate, separated from each other, and disposed in a pixel area;
a second substrate facing the first substrate;
a liquid crystal layer provided between the first substrate and the second substrate,
wherein the first subpixel electrode includes a first horizontal stem, a first vertical stem, and a plurality of first branch electrodes extending from the first horizontal stem and the first vertical stem, the second subpixel electrode includes a second horizontal stem, second vertical stems, the second vertical stems including two connecting portions which connect an upper portion of the second subpixel electrode and a lower portion of the second subpixel electrode and are disposed adjacent to opposite edges of the first subpixel electrode, respectively, the upper portion and the lower portion being spaced apart from each other with the first subpixel electrode intervened therebetween, and a plurality of second branch electrodes extending from the second horizontal stem and the second vertical stems, the second subpixel electrode is provided to an external side of the pixel area to surround the first subpixel electrode, wherein a first area formed by connecting ends of the plurality of first branch electrodes and a second area formed by connecting ends of the plurality of second branch electrodes do not overlap in a plan view, wherein the storage electrode includes a first storage electrode overlapping the first horizontal stem of the first subpixel electrode, and second storage electrodes completely overlapping the connecting portions of the second subpixel electrodes, wherein the second storage electrodes further include a portion overlapping the first vertical stem, and wherein the portion that overlaps the first vertical stem overlaps a lower half of the first vertical stem and does not overlap an upper half of the first vertical stem.

2. The liquid crystal display of claim 1, wherein
a first voltage applied to the first subpixel electrode is greater than a second voltage applied to the second subpixel electrode.

3. The liquid crystal display of claim 2, wherein
the second vertical stems are connected to the second horizontal stem and include two vertical stems extending parallel to two opposing edges of the pixel electrode, the opposing edges being parallel to a data line, and
the second storage electrodes overlap the two vertical stems.

4. The liquid crystal display of claim 3, wherein
the second storage electrodes overlap at least a part of the two vertical stems.

5. The liquid crystal display of claim 3, wherein
the first horizontal stem is connected to the first vertical stem to form a cross shape.

6. The liquid crystal display of claim 5, wherein
the storage electrode further includes a third storage electrode overlapping at least a part of the first vertical stem of the first subpixel electrode.

7. The liquid crystal display of claim 6, wherein
the first vertical stem extends between the second branch electrodes.

8. The liquid crystal display of claim 7, wherein
an overall shape of the first subpixel electrode is a hexagon, and an overall shape of the second subpixel electrode is a rectangle formed with four trapezoids.

9. The liquid crystal display of claim 2, wherein
the first horizontal stem is connected to the first vertical stem to form a cross shape.

10. The liquid crystal display of claim 9, wherein
the storage electrode further includes a third storage electrode overlapping at least a part of the first vertical stem of the first subpixel electrode.

11. The liquid crystal display of claim 10, wherein
the first vertical stem extends between the second branch electrodes.

12. The liquid crystal display of claim 11, wherein
an overall shape of the first subpixel electrode is a hexagon, and an overall shape of the second subpixel electrode is a rectangle formed with four trapezoids.

13. The liquid crystal display of claim 2, wherein
the storage electrode further includes a third storage electrode overlapping at least a part of the first vertical stem of the first subpixel electrode.

14. The liquid crystal display of claim 13, wherein
the first vertical stem extends between the second branch electrodes.

15. The liquid crystal display of claim 14, wherein
an overall shape of the first subpixel electrode is a hexagon, and an entire shape of the second subpixel electrode is a rectangle formed with four trapezoids.

16. The liquid crystal display of claim 2, wherein
an entire shape of the first subpixel electrode is a polygon, and an entire shape of the second subpixel electrode is a rectangle formed with four trapezoids.

17. A liquid crystal display comprising:
a first substrate;
a reference voltage line formed on the first substrate and including a storage electrode;
a pixel electrode including a first subpixel electrode and a second subpixel electrode formed on a same plane on the first substrate, separated from each other, and disposed in a pixel area;
a second substrate facing the first substrate;
a liquid crystal layer provided between the first substrate and the second substrate,
wherein the first subpixel electrode includes a first horizontal stem, a first vertical stem, and a plurality of first branch electrodes extending from the first horizontal stem and the first vertical stem, the second subpixel electrode includes a second horizontal stem, second vertical stems, the second vertical stems including two connecting portions which connects an upper portion of the second subpixel electrode and a lower portion of the second subpixel electrode and are disposed adjacent to opposite edges of the first subpixel electrode, respectively, the upper portion and the lower portion being spaced apart from each other with the first subpixel electrode intervened therebetween, and a plurality of second branch electrodes extending from the second horizontal stem and the second vertical stems, the second subpixel electrode is provided to an external side of the pixel area to surround the first subpixel electrode,
wherein a first area formed by connecting ends of the plurality of first branch electrodes and a second area formed by connecting ends of the plurality of second branch electrodes do not overlap in a plan view,
wherein the storage electrode includes a first storage electrode overlapping the first horizontal stem of the first subpixel electrode, and second storage electrodes completely overlapping the connecting portions of the second subpixel electrodes,
wherein the second storage electrodes further include a portion overlapping the first vertical stem, and
wherein the portion that overlaps the first vertical stem substantially overlaps an entire portion of the first vertical stem.

* * * * *